United States Patent
Moriwaki et al.

(10) Patent No.: US 9,213,207 B2
(45) Date of Patent: Dec. 15, 2015

(54) ELECTRO-OPTICAL DEVICE AND ELECTRONIC APPARATUS

(75) Inventors: Minoru Moriwaki, Fujimi-machi (JP); Hiroaki Mochizuki, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 370 days.

(21) Appl. No.: 13/083,933

(22) Filed: Apr. 11, 2011

(65) Prior Publication Data
US 2011/0249227 A1 Oct. 13, 2011

(30) Foreign Application Priority Data

Apr. 12, 2010 (JP) .................. 2010-091177
Mar. 30, 2011 (JP) .................. 2011-074369

(51) Int. Cl.
*G02F 1/1343* (2006.01)
*G02F 1/1362* (2006.01)

(52) U.S. Cl.
CPC .... *G02F 1/136213* (2013.01); *G02F 1/136286* (2013.01); *G02F 1/136227* (2013.01)

(58) Field of Classification Search
CPC ............. G02F 1/136213; G02F 1/136286
USPC ....................................................... 349/38–43
See application file for complete search history.

(56) References Cited

U.S. PATENT DOCUMENTS

| 7,342,638 | B2* | 3/2008 | Eguchi .......................... 349/187 |
| 2001/0022365 | A1 | 9/2001 | Murade |
| 2004/0004221 | A1 | 1/2004 | Murade |
| 2004/0119075 | A1 | 6/2004 | Murade |
| 2008/0198284 | A1* | 8/2008 | Oyamada ........................ 349/39 |
| 2009/0051840 | A1 | 2/2009 | Yasukawa |
| 2009/0128757 | A1* | 5/2009 | Koshihara et al. ............ 349/114 |
| 2010/0188591 | A1* | 7/2010 | Oikawa .......................... 349/39 |

FOREIGN PATENT DOCUMENTS

| JP | 2001-330856 A | 11/2001 |
| JP | 2004-125887 A | 4/2004 |
| JP | 2007-199189 A | 8/2007 |
| JP | 2008-008942 A | 1/2008 |
| JP | 2008-111924 A | 5/2008 |
| JP | 2008-241978 A | 10/2008 |
| JP | 2009-048064 A | 3/2009 |

* cited by examiner

*Primary Examiner* — Dung Nguyen
(74) *Attorney, Agent, or Firm* — ALG Intellectual Property, LLC

(57) ABSTRACT

In at least one embodiment of the disclosure, an electro-optical device comprises a pixel electrode and a transistor corresponding to the pixel electrode. A data line is electrically connected to the transistor. A storage capacitor is provided between the pixel electrode and the transistor. The storage capacitor has a first capacitance electrode and a second capacitance electrode facing each other. A capacitance isolation film is interposed therebetween. An additional capacitor is electrically connected to the data line. The additional capacitor has a first additional capacitance electrode and a second additional capacitance electrode facing each other. An additional capacitance isolation film is interposed therebetween. The first additional capacitance electrode is provided on a same layer as the first capacitance electrode. The second additional capacitance electrode is provided on a layer different from the layers of the first and second capacitance electrodes.

11 Claims, 14 Drawing Sheets

ELECTRO-OPTICAL DEVICE AND ELECTRONIC APPARATUS

CROSS-REFERENCE

The present application claims priority from Japanese Patent Application Nos. 2010-091177 filed on Apr. 12, 2010 and 2011-074369 filed on Mar. 30, 2011 which are hereby incorporated by reference in their entirety.

BACKGROUND

Among electro-optical devices, there is known, for example, an electro-optical device configured to supply an image signal to a data line by turning on or off a sampling switch of a sampling circuit. In this kind of device, for example, there may occur a phenomenon in which an image signal potential of a data line at the side of a drain of the sampling switch decreases lower than an original potential value (which is called push-down) or increases higher than the original potential value (which is called push-up). For this reason, there is proposed a technology that forms an additional capacitor in a part of a data line extending in a peripheral area (see, for example, JPA-2004-125887 and JP-A-2008-8942).

For example, compared to a storage capacitor provided in a pixel unit, a comparatively high voltage such as static electricity may be easily applied to the additional capacitor provided in the data line. However, in the technologies disclosed in JP-A-2004-125887 and JP-A-2008-8942, there is no description for a method of improving a pressure resistance performance of the additional capacitor. When a high voltage is unintentionally applied to the additional capacitor, a problem related to the display may occur and the device may be damaged. That is, in the above-described technologies, there is a technical problem in that the reliability of the device may be insufficient.

SUMMARY

In accordance with certain embodiments of the disclosure, it is possible to provide an electro-optical device having high reliability and an electronic apparatus including the same.

According to an aspect of the disclosure, there is provided an electro-optical device including: a pixel electrode; a transistor which is provided to correspond to the pixel electrode; a data line which is electrically connected to the transistor; a storage capacitor which is provided between the pixel electrode and the transistor in a manner such that first and second electrodes are disposed to face each other with a capacitance isolation film interposed therebetween; and an additional capacitor which is provided in a manner such that a first additional capacitance electrode provided on the same layer as that of the first electrode and a second additional capacitance electrode provided on a layer different from those of the first and second electrodes are disposed to face each other with an additional capacitance isolation film interposed therebetween, and which is electrically connected to the data line.

In the electro-optical device, for example, an electro-optical material such as a liquid crystal is interposed between an element substrate having a pixel electrode and a transistor such as a pixel switching TFT electrically connected to the pixel electrode and a counter substrate having a counter electrode facing the pixel electrode. During the operation of the electro-optical device, an image signal is selectively supplied to the pixel electrode, so that an image is displayed on a pixel area (or an image display area) where plural pixel electrodes are arranged. Further, the image signal is supplied from the data line to the pixel electrode at a predetermined timing by turning on or off the transistor electrically connected to the data line and the pixel electrode.

In the electro-optical device, the storage capacitor is provided between the pixel electrode and the transistor. The storage capacitor is formed in a manner such that the first and second electrodes are disposed to face each other with the capacitance isolation film interposed therebetween. More specifically, one of the first and second electrodes functions as a pixel potential side capacitance electrode by receiving the image signal, and the other thereof functions as a fixed potential side capacitance electrode by receiving a constant potential such as a common potential supplied to the counter electrode. According to the storage capacitor, the potential holding characteristic in the pixel electrode may be improved, contrast may be improved, and flickering may be reduced.

In the electro-optical device, the additional capacitor is provided in the data line in the peripheral area located in the periphery of, for example, the display area. According to the additional capacitor, for example, a variation in the potential necessary to be held by the data line may be suppressed. Accordingly, the display irregularity caused by a variation in the potential of the data line may be prevented, and the display quality may be improved.

Here, in the electro-optical device, particularly the additional capacitor is formed in a manner such that the first additional capacitance electrode provided on the same layer as that of the first electrode forming the storage capacitor in the display area and the second additional capacitance electrode provided on a layer different from those of the first and second electrodes are disposed to face each other with the additional capacitance isolation film interposed therebetween. That is, the electrode forming the additional capacitor is formed on the same layer as that of the electrode forming the storage capacitor, and the other electrode is formed on a layer different from that of the electrode forming the storage capacitor. Here, the "same layer" indicates the layer formed by the same film forming process.

According to the above-described configuration, since the first additional capacitance electrode and the second additional capacitance electrode forming the additional capacitor are formed on different layers, the pressure resistance performance of the additional capacitor may be improved. Specifically, when the first additional capacitance electrode and the second additional capacitance electrode are formed on different layers, the end surfaces of the two facing electrodes may not be evenly aligned with each other. Accordingly, concentration of the electric field may be prevented, and pressure resistance performance may be improved.

For example, compared to the storage capacitor provided in the display area, a comparatively high voltage such as static electricity may be easily applied to the additional capacitor. Accordingly, the pressure resistance performance of the additional capacitor may be improved, whereby the reliability of the device may be most effectively improved.

Further, since the first additional capacitance electrode is formed on the same layer as that of the first electrode forming the storage capacitor, the configuration of the device and the manufacturing process thereof may be prevented from being complicated and an increase in the manufacturing cost may be prevented compared to the case where, for example, all the first additional capacitance electrodes and the second additional capacitance electrodes are formed on a layer different from those of the first and second electrodes forming the storage capacitor.

As described above, according to the electro-optical device, the pressure resistance performance of the additional capacitor may be improved. Accordingly, a highly reliable device may be realized.

In an aspect of the electro-optical device, the first and second electrodes may be simultaneously patterned to be formed in the same area.

According to this aspect, the first and second electrodes forming the storage capacitor are formed on the same area since they are patterned at the same time after two films forming the electrodes are formed. Here, the "same time" does not indicate that the first and second electrodes are patterned at exactly the same time, but indicates that the first and second electrodes are patterned by the same process. For example, the first and second electrodes are formed in a manner such that the films are formed to be laminated and are etched together.

Since the first and second electrodes are formed on the same area, the storage capacitor may be efficiently formed. That is, a high capacitance may be obtained within a comparatively small space. Further, when the first capacitance electrode and the second additional capacitance electrode are respectively formed on the same layers as those of the first and second electrodes, the first additional capacitance electrode and the second additional capacitance electrode are also formed on the same area, which may cause a concern that the pressure resistance performance of the additional capacitor is greatly degraded. However, the second additional capacitance electrode is formed on a layer different from those of the first and second electrodes. Accordingly, degradation of the pressure resistance performance of the additional capacitor may be prevented.

In another aspect of the electro-optical device, a third electrode may be formed on the same layer as that of the second additional capacitance electrode, and the first and third electrodes may be disposed to face each other with another capacitance isolation film interposed therebetween.

According to this aspect, the first electrode and the third electrode may form the storage capacitor. Accordingly, the storage capacitor is formed at two positions, that is, a position between the first and second electrodes and a position between the first electrode and the third electrode. Accordingly, the capacitance per unit of the area may be increased.

In the aspect including the third electrode, the first electrode may be electrically connected to the pixel electrode and the transistor, and the second and third electrodes may be electrically connected to a constant potential interconnection supplying a constant potential.

In this case, for example, the first electrode is electrically connected to the pixel electrode or the relay layer through the contact hole, where the relay layer is used to relay the electrical connection between the pixel electrode and the transistor. Accordingly, the first electrode has the same potential as that of the pixel electrode. On the other hand, the second electrode and the third electrode are electrically connected to, for example, the capacitance line through the contact hole, and a constant potential such as a common potential supplied to the counter electrode is supplied thereto.

According to the above-described configuration, the storage capacitor may be reliably formed between the first and second electrodes and between the first electrode and the third electrode, and the storage capacitors are connected in parallel to each other. Accordingly, a high-density storage capacitor may be formed within a comparatively small area.

Alternatively, in the aspect including the third electrode, the first electrode may be electrically connected to a constant potential interconnection supplying a constant potential, and the second and third electrodes may be electrically connected to the pixel electrode and the transistor.

In this case, for example, the first electrode is electrically connected to the capacitance line through the contact hole, and a constant potential such as a common potential supplied to the counter electrode is supplied thereto. On the other hand, for example, the second electrode and the third electrode are electrically connected to the pixel electrode or the relay layer through the contact hole, where the relay layer is used to relay the electrical connection between the pixel electrode and the transistor. Accordingly, the second electrode and the third electrode have the same potential as that of the pixel electrode.

According to the above-described configuration, the storage capacitor may be more reliably formed between the first and second electrodes and between the first electrode and the third electrode, and the storage capacitors are connected in parallel to each other. Accordingly, a high-density storage capacitor may be formed within a comparatively small area.

In another aspect of the electro-optical device, the first additional capacitance electrode may be electrically connected to an electrode provided on the same layer as that of the second electrode.

According to this aspect, since the first additional capacitance electrode provided on the same layer as that of the first electrode is electrically connected to the electrode provided on the same layer as that of the second electrode, a stable potential may be supplied to the first additional capacitance electrode. Further, since the electrodes considered to have the comparatively low pressure resistance performance are electrically connected to each other in advance, a problem of the device caused by an unexpected short-circuit may be prevented.

In another aspect of the electro-optical device, an image signal supply unit may be provided to supply the image signal to each data line block including a plurality of the data lines, and the capacitance of the additional capacitor electrically connected to the data line located at the end of the data line block may be smaller than that of the additional capacitor electrically connected to the other data line of the data line block.

According to this aspect, the image signal is simultaneously supplied to each data line block including plural data lines. In this case, since the data line located at the end of each data line block is adjacent to the data lines of the other data line blocks, a difference in parasitic capacitance occurs in the other data lines of the same data line block.

Specifically, when signals are written to the data line located at the end of the data line block, signals are held or completely written to the adjacent data lines (that is, the data lines of the other data line blocks). For this reason, parasitic capacitance becomes comparatively large. On the other hand, when signals are written to the data lines not located at the ends of the data line block, the signals are written to the adjacent data lines in this state. For this reason, parasitic capacitance becomes comparatively small. Accordingly, if any countermeasure is not prepared, a difference in the parasitic capacitance occurs in each data line of the data line block.

However, in this aspect, the capacitance of the additional capacitor electrically connected to the data line located at the end of the data line block is set to be smaller than that of the additional capacitor electrically connected to the other data line of the data line block. That is, when the capacitance of the additional capacitance of the data line causing comparatively large parasitic capacitance is set to be small, a difference in the capacitance obtained by adding the parasitic capacitance to the additional capacitance may be reduced. Accordingly, problems such as a sequential stripe in the display caused by a difference in the capacitance may be effectively prevented.

According to another aspect of the disclosure, an electronic apparatus includes the above-described electro-optical devices (here, various structures thereof are also included).

According to the electronic apparatus, since the above-described electro-optical device is provided, it is possible to realize various electronic apparatuses such as a highly reliable projection type display device, a television, a cellular phone, an electronic scheduler, a word processor, a view finder type or a monitor direct view type video tape recorder, a workstation, a television phone, a POS terminal, and a touch panel. Further, as the electronic apparatus, for example, an electrophoretic device such as electronic paper may be realized.

Other effects and benefits of the disclosure will become apparent from the embodiments to be described later.

BRIEF DESCRIPTION OF THE DRAWINGS

Non-limiting and non-exhaustive embodiments of the present disclosure will be described with reference to the accompanying drawings, wherein like numbers reference like elements.

DESCRIPTION OF EXEMPLARY EMBODIMENTS

Hereinafter, exemplary embodiments of the disclosure will be described by referring to the accompanying drawings. It is to be understood, however, that other embodiments may be utilized and changes may be made without departing from the scope of the present disclosure. Therefore, the following detailed description is not to be taken in a limiting sense, and the scope of the present disclosure is defined by the appended claims and their equivalents.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," "one," and "the" may include reference to both the singular and the plural. Reference in the specification to "one embodiment" or "an embodiment" means that a particular feature, structure, or characteristic described in connection with the embodiment may be included in at least one embodiment of the disclosure. The appearances of the phrases "in one embodiment" or "in an embodiment" in various places in the specification do not necessarily all refer to the same embodiment, but it may.

Several embodiments will sequentially be described under corresponding section headings below. Section headings are merely employed to improve readability, and they are not to be construed to restrict or narrow the present disclosure. For example, the order of description headings should not necessarily be construed so as to imply that these operations are necessarily order dependent or to imply the relative importance of an embodiment. Moreover, the scope of a disclosure under one section heading should not be construed to restrict or to limit the disclosure to that particular embodiment, rather the disclosure should indicate that a particular feature, structure, or characteristic described in connection with a section heading is included in at least one embodiment of the disclosure, but it may also be used in connection with other embodiments.

Electro-Optical Device

An electro-optical device according to the embodiments will be described by referring to FIGS. 1 to 20. Further, in the embodiments below, a liquid crystal device of a TFT (Thin Film Transistor) active matrix driving type having a driving circuit will be described as an example of the electro-optical device of the disclosure.

First Embodiment

First, the overall configuration of the electro-optical device will be described by referring to FIGS. 1 and 2. Here, FIG. 1 is a plan view illustrating an overall configuration of the electro-optical device according to the embodiment, and FIG. 2 is a cross-sectional view taken along the line II-II of FIG. 1.

Figure 1:
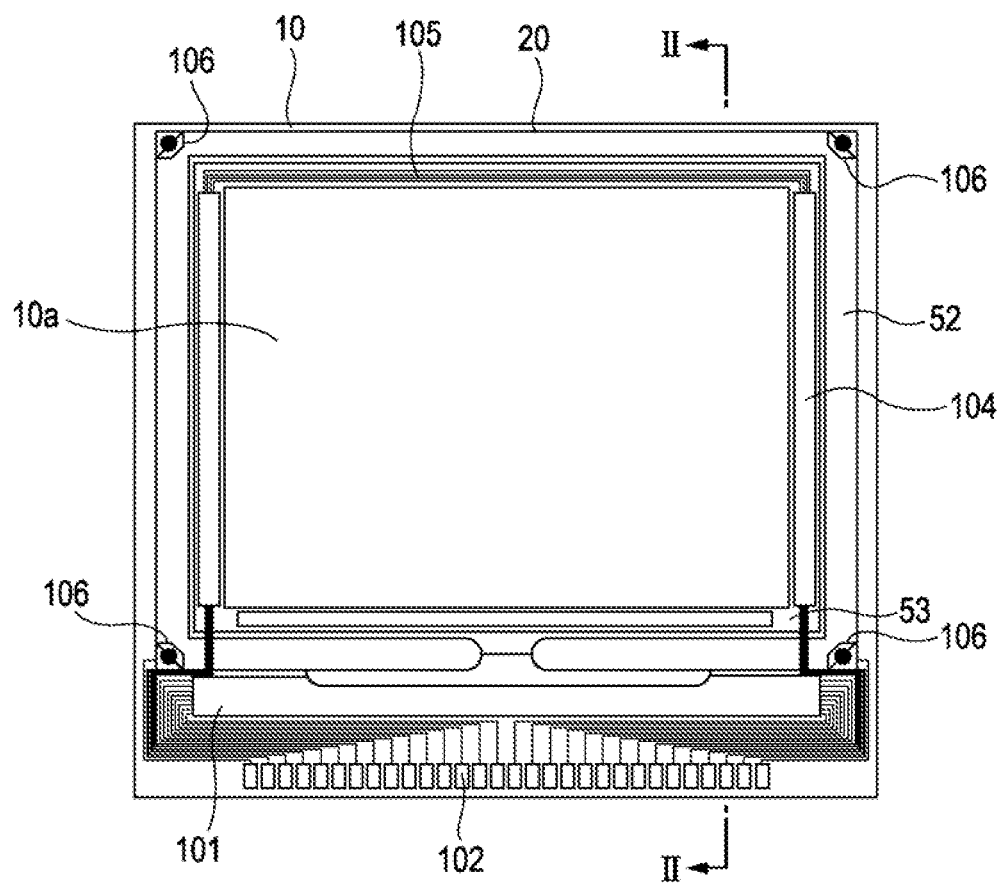
FIG. 1 is a plan view illustrating an overall configuration of an electro-optical device according to a first embodiment.
Figure 2:
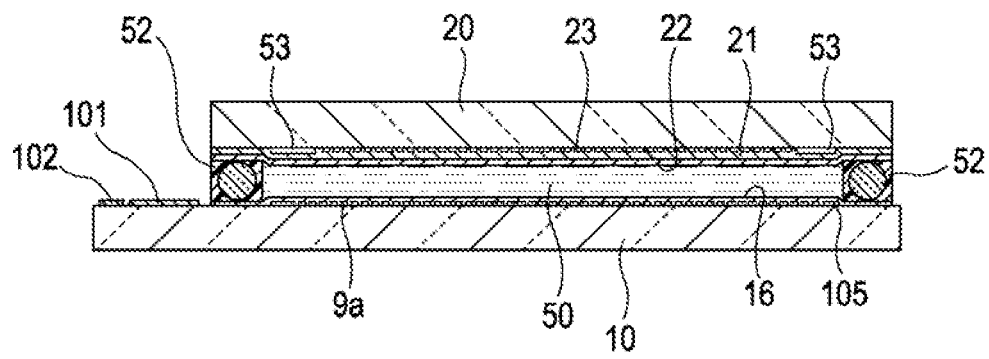
FIG. 2 is a cross-sectional view taken along the line II-II.

In FIGS. 1 and 2, the electro-optical device according to the embodiment has a structure in which a TFT array substrate 10 and a counter substrate 20 are disposed to face each other. An example of the TFT array substrate 10 includes a transparent substrate such as a quartz substrate and a glass substrate or a silicon substrate. An example of the counter substrate 20 includes a transparent substrate such as a quartz substrate and a glass substrate. A liquid crystal layer 50 is enclosed between the TFT array substrate 10 and the counter substrate 20. The liquid crystal layer 50 is formed of liquid crystals formed by mixing, for example, a single or multiple types of nematic liquid crystals, and takes a predetermined alignment state between a pair of alignment films.

The TFT array substrate 10 and the counter substrate 20 are adhered to each other by a seal material 52 that is provided in a seal area located in the periphery of an image display area 10a where plural pixel electrodes are provided.

The seal material 52 is formed of, for example, a UV curable resin, a thermosetting resin, or the like so as to adhere both substrates to each other, and is cured by the irradiation of UV rays or the heating after it is applied onto the TFT array substrate 10 during a manufacturing process. A gap material such as a glass fiber or a glass bead is scattered in the seal material 52 to set a gap (a gap between the substrates) between the TFT array substrate 10 and the counter substrate 20 as a predetermined value. Further, the gap material may be disposed on the image display area 10a or the periphery of the image display area 10a in addition to or instead of the mixture with the seal material 52.

A frame light shielding film 53 is provided on the side of the counter substrate 20 in parallel to the seal area provided with the seal material 52 to define a frame area of the image display area 10a. Further, a part or entire part of the frame light shielding film 53 may be provided on the side the TFT array substrate 10 as an inner light shielding film.

A data line driving circuit 101 and external circuit connection terminals 102 are provided along one side of the TFT array substrate 10 in an area disposed on the outside of the seal area provided with the seal material 52 in the peripheral area. A scanning line driving circuits 104 is provided along two sides adjacent to the one side so as to be shielded by the frame light shielding film 53. Further, plural interconnections 105 are provided along the rest one side of the TFT array substrate 10 so as to connect two scanning line driving circuits 104 provided on both sides of the image display area 10a while the interconnections are shielded by the frame light shielding film 53.

In an area on the TFT array substrate 10 facing four corner portions of the counter substrate 20, a vertical conduction terminal 106 is disposed to electrically connect both substrates to each other by a vertical conductive material. With this configuration, the TFT array substrate 10 and the counter substrate 20 may be electrically connected to each other.

In FIG. 2, a laminated structure formed by a pixel switching TFT as a driving element or interconnections such as a scanning line and a data line is formed on the TFT array substrate 10. The specific configuration of the laminated structure is not shown in FIG. 2, but a pixel electrode 9a formed of a transparent material such as ITO (Indium Tin Oxide) is formed on the laminated structure for each pixel to have an island shape in a predetermined pattern.

The pixel electrode 9a is formed on the image display area 10a on the TFT array substrate 10 so as to face the counter electrode 21. An alignment film 16 is formed on a surface facing the liquid crystal layer 50 in the TFT array substrate 10, that is, the surface of the pixel electrode 9a so that the alignment film shields the pixel electrode 9a.

A light shielding film 23 is formed on the surface of the counter substrate 20 facing the TFT array substrate 10. The light shielding film 23 is formed in a lattice shape when seen from, for example, the facing surface of the counter substrate 20. In the counter substrate 20, a non-opening region is defined by the light shielding film 23, and an area divided by the light shielding film 23 is an opening area through which light emitted from, for example, a projector lamp or a direct view type backlight is transmitted. Further, the light shielding film 23 may be formed in a stripe shape, and the light shielding film 23 and various constituents such as a data line provided on the side of the TFT array substrate 10 may define the non-opening area.

Plural counter electrodes 21 are formed of a transparent material such as ITO and are formed on the light shielding film 23 so as to respectively face the plural pixel electrodes 9a. Further, a color filter (not shown in FIG. 2) may be formed in an area including a part of the opening area and the non-opening area on the light shielding film 23 so as to perform a color display on the image display area 10a. An alignment film 22 is formed on the counter electrodes 21 on the surface of the counter substrate 20 facing the TFT array substrate.

Further, the TFT array substrate 10 shown in FIGS. 1 and 2 may have thereon not only the driving circuits such as the data line driving circuit 101 and the scanning line driving circuits 104, but also a sampling circuit configured to sample an image signal on an image signal line and supply the sampled image signal to the data line, a precharge circuit configured to supply a precharge signal of a predetermined voltage level to the plural data lines prior to the image signal, an inspection circuit configured to inspect quality, defect, and the like of the electro-optical device during the manufacturing thereof, and the like.

Next, the electric configuration of a pixel unit of the electro-optical device according to the embodiment will be described by referring to FIG. 3. Here, FIG. 3 is an equivalent circuit diagram of various elements, interconnections, and the like in the plural pixels formed in a matrix shape and forming the image display area of the electro-optical device according to the embodiment.

Figure 3:
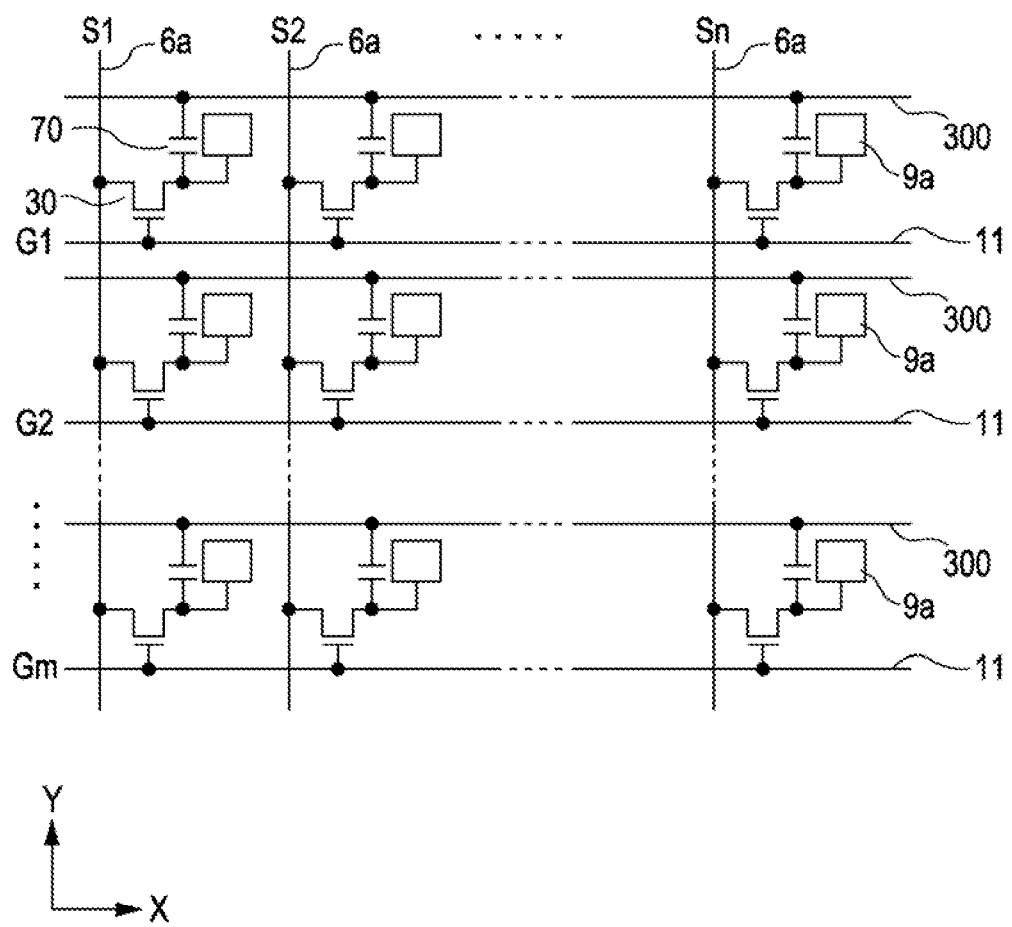
FIG. 3 is an equivalent circuit diagram of various elements, interconnections, and the like in an image display area of the electro-optical device according to the first embodiment.

In FIG. 3, each of the plural pixels formed in a matrix shape and forming the image display area 10a is provided with the pixel electrode 9a and a TFT 30. The TFT 30 is electrically connected to the pixel electrode 9a, and is used to control a switching state of the pixel electrode 9a when the electro-optical device is operated. A data line 6a to which the image signal is supplied is electrically connected to the source of the TFT 30. The image signals S1, S2, . . . Sn written to the data line 6a may be sequentially supplied in this order or may be supplied each group of the plural data line 6a adjacent to each other.

A scanning line 11 is electrically connected to the gate of the TFT 30, and the electro-optical device according to the embodiment is configured to sequentially apply the scanning signals G1, G2, . . . Gm at a predetermined timing in a pulsar manner to the scanning line 11 in this order. The pixel electrode 9a is electrically connected to the drain of the TFT 30, and when the TFT 30 as a switching element is closed for a certain period of time, the image signals S1, S2, . . . Sn supplied from the data line 6a are written in a predetermined timing. The image signals S1, S2, . . . Sn of a predetermined level written to the liquid crystal as an example of an electro-optical material through the pixel electrode 9a are held between the liquid crystal and the counter electrode formed on the counter substrate for a certain period of time.

The liquid crystal forming the liquid crystal layer 50 (refer to FIG. 2) is used to modulate light and enable a grayscale display in a manner such that the orientation or the order of the molecular aggregation changes in accordance with the level of the applied voltage. For example, in a normally white mode, the transmissivity for the incident light decreases in accordance with the voltage applied for the unit of each pixel.

In a normally black mode, the transmissivity for the incident light increases in accordance with the voltage applied for the unit of each pixel. Accordingly, the light having a contrast in accordance with the image signal is emitted from the entire electro-optical device.

Here, in order to prevent the leakage of the held image signal, a storage capacitor 70 is additionally provided in parallel to the liquid crystal capacitor formed between the pixel electrode 9a and the counter electrode 21 (refer to FIG. 2). The specific configuration of the storage capacitor 70 will be described later in detail.

Figure 4:
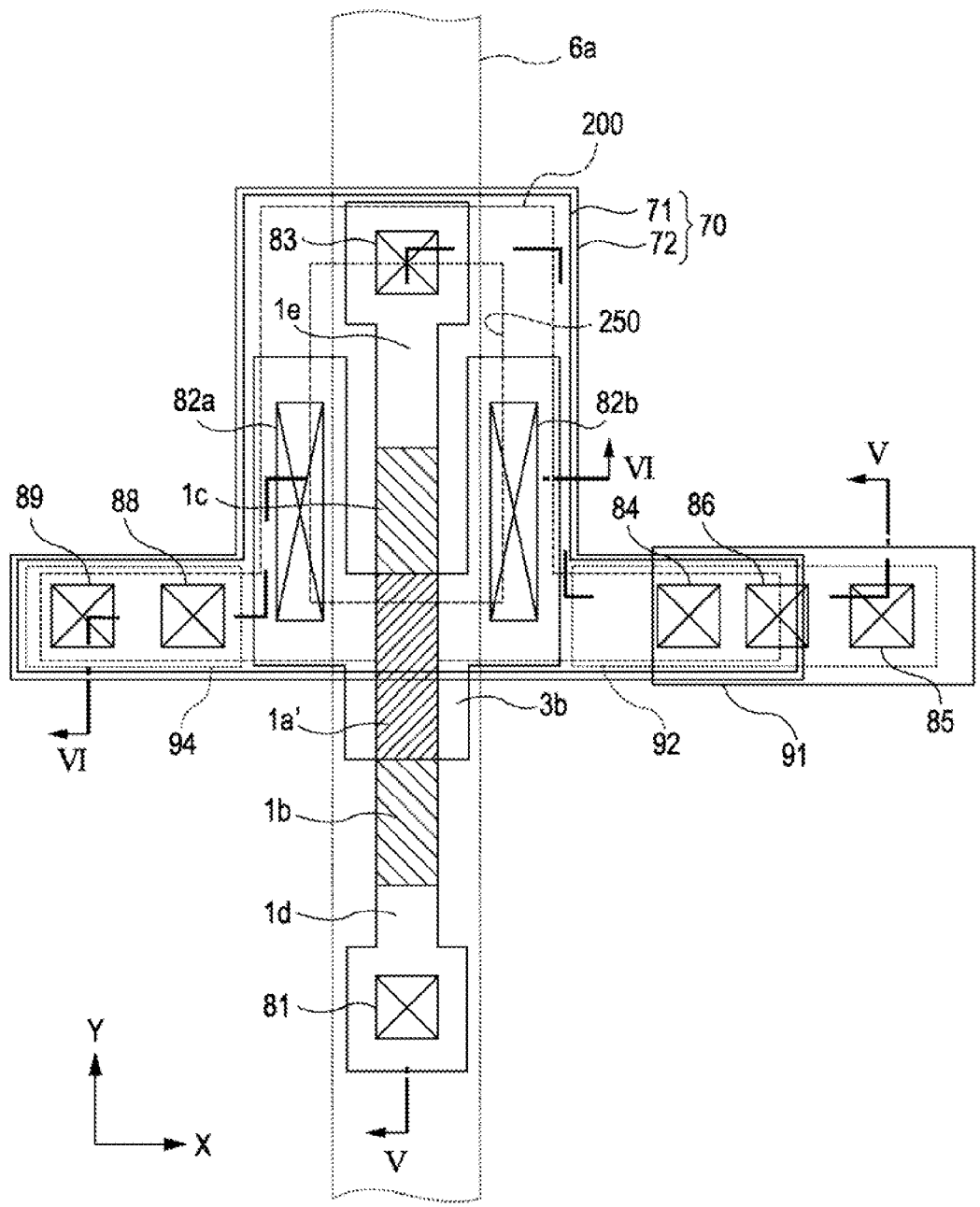
FIG. 4 is a plan view visibly illustrating the disposition of a conductive layer in the periphery of a TFT of the electro-optical device according to the first embodiment.
Figure 5:
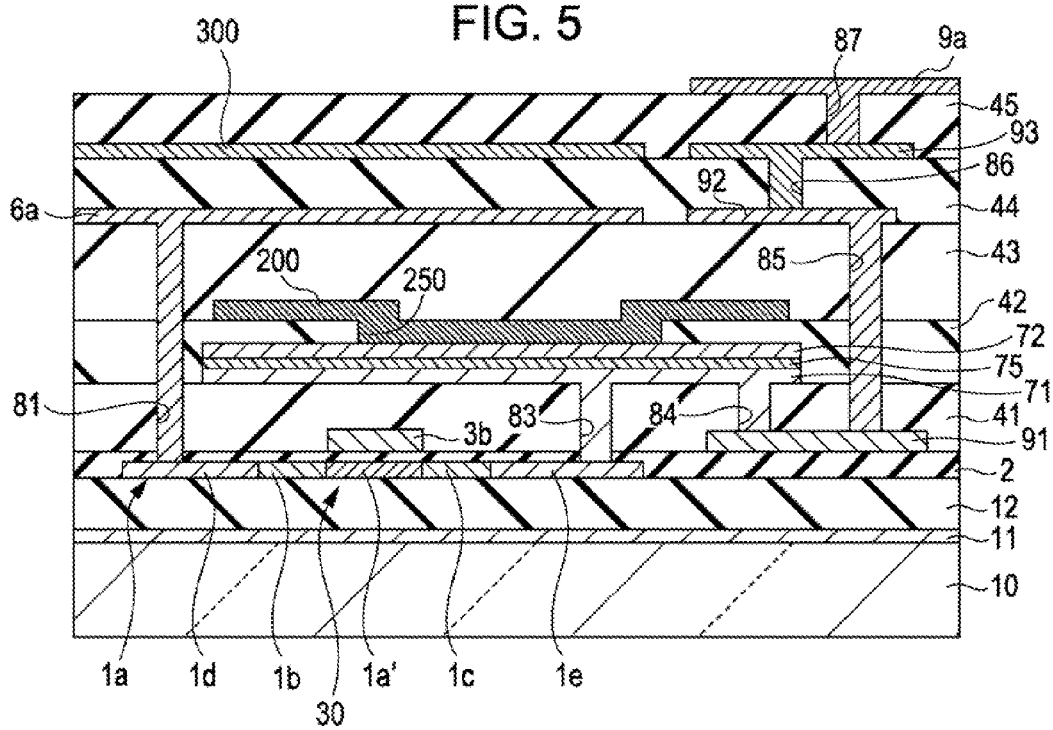
FIG. 5 is a cross-sectional view taken along the line V-V of FIG. 4.
Figure 6:
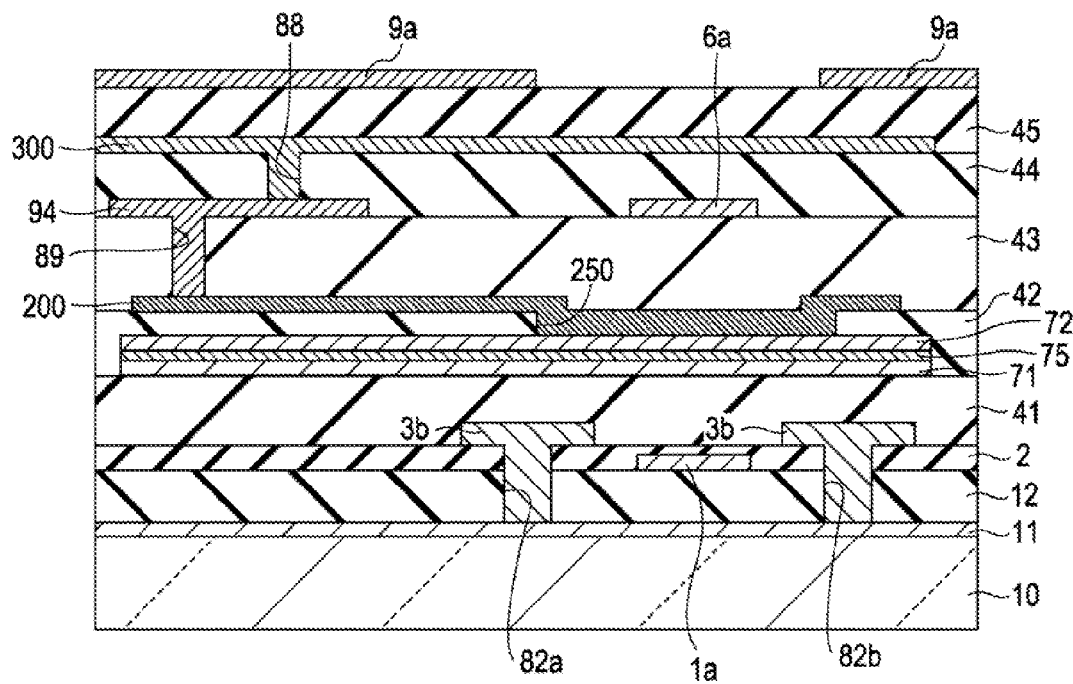
FIG. 6 is a cross-sectional view taken along the line VI-VI of FIG. 4.

Next, the specific configuration of the pixel unit realizing the above-described operation will be described by referring to FIGS. 4 to 6. Here, FIG. 4 is a plan view visibly illustrating the disposition of the conductive layer in the periphery of the TFT of the electro-optical device according to the first embodiment. FIG. 5 is a cross-sectional view taken along the line V-V of FIG. 4, and FIG. 6 is a cross-sectional view taken along the line VI-VI of FIG. 4. Further, in FIGS. 4 to 6, the scales of the respective layers and members are set to be different from the real scales so that the respective layers and members may be recognized on the drawings. Furthermore, in FIG. 4, for convenience of description, the layers on the lower side of the semiconductor layer and the layers on the upper side of the data line are not shown.

In FIGS. 4 and 5, the TFT 30 includes a semiconductor layer 1a and a gate electrode 3b.

The semiconductor layer 1a is formed of, for example, polysilicon, and includes a channel area 1a' having a channel length in the Y direction, a data line side LDD area 1b, a pixel electrode side LDD area 1c, a data line side source drain area 1d, and a pixel electrode side source drain area 1e. That is, the TFT 30 has an LDD structure.

The data line side source drain area 1d and the pixel electrode side source drain area 1e are formed to be symmetrical to each other like a mirror shape in the Y direction with respect to the channel area 1a' as a center. The data line side LDD area 1b is formed between the channel area 1a' and the data line side source drain area 1d. The pixel electrode side LDD area 1c is formed between the channel area 1a' and the pixel electrode side source drain area 1e.

The data line side LDD area 1b, the pixel electrode side LDD area 1c, the data line side source drain area 1d, and the pixel electrode side source drain area 1e are impurity areas which are formed by implanting impurities in the semiconductor layer 1a by, for example, impurity implantation such as ion implantation. The data line side LDD area 1b and the pixel electrode side LDD area 1c are respectively formed as low-concentration impurity areas respectively having fewer impurities than those of the data line side source drain area 1d and the pixel electrode side source drain area 1e. With such impurity areas, an off-current flowing across the source area and the drain area may be reduced when the TFT 30 is not operated, and a decrease in the amount of an on-current flowing when the TFT 30 is operated may be prevented.

Further, it is desirable that the TFT 30 has the LDD structure. However, the TFT may have an offset structure in which impurity implantation is not performed on the data line side LDD area 1b and the pixel electrode side LDD area 1c, or may have a self-aligned structure in which a high concentration of impurities are implanted by using the gate electrode as a mask to form the data line side source drain area and the pixel electrode side source drain area.

The gate electrode 3b is formed of, for example, conductive polysilicon, and is formed to partially face the channel area 1a' of the semiconductor layer 1a. The gate electrode 3b and the semiconductor layer 1a are electrically isolated from each other by a gate isolation film 2. Further, a first relay layer 91 is formed on the same layer as that of the gate electrode 3b.

In FIGS. 5 and 6, the scanning line 11 is provided on the lower layer side of the TFT 30 on the TFT array substrate 10 with an underlying isolation film 12 interposed therebetween. The scanning line 11 is formed of a light shielding material such as elemental metal, alloy, metallic silicide, polysilicide, and lamination of these, which includes at least one of, for example, Ti (titanium), Cr (chrome), W (tungsten), Ta (tantalum), Mo (molybdenum), Pd (palladium), and the like having a high melting point. The scanning line 11 also functions as a lower light shielding film that performs a rear surface reflection of the TFT array substrate 10 or shields the channel area 1a' of the TFT 30 and the periphery thereof from the returned light which is incident from the TFT array substrate 10 to the inside of the electro-optical device, the light being generated from other liquid crystal devices such as a multiple-plate type projector and being propagated through a synthesis optical system.

In FIG. 6, the scanning line 11 is electrically connected to the gate electrode 3b through contact holes 82a and 82b. Accordingly, a gate signal is supplied to the gate electrode 3b by the scanning line 11.

The underlying isolation film 12 has not only a function of electrically isolating the TFT 30 from the scanning line 11, but also a function of preventing degradation of the characteristic of the pixel switching TFT 30 caused by roughness of the polishing of the surface of the TFT array substrate 10 or dirt remaining after the cleaning thereof in a manner such that the underlying isolation film is formed on the entire surface of the TFT array substrate 10.

In FIGS. 5 and 6, a storage capacitor 70 is provided on the upper layer side of the TFT 30 on the TFT array substrate 10 with a first interlayer isolation film 41 interposed therebetween. The storage capacitor 70 is formed in a manner such that a lower capacitance electrode 71 and an upper capacitance electrode 72 face each other with a dielectric film 75 interposed therebetween. Further, here, the lower capacitance electrode 71 is an example of "the second capacitance electrode" of the disclosure, the upper capacitance electrode 72 is an example of "the first capacitance electrode" of the disclosure, and the dielectric film 75 is an example of "the capacitance isolation film" of the disclosure.

The upper capacitance electrode 72 is a fixed potential side capacitance electrode that is electrically connected to a constant potential source through a capacitance line 300 to be described later, and is maintained at a fixed potential. The upper capacitance electrode 72 is formed of, for example, an opaque metallic film including metal such as Al (aluminum) or Ag (silver) or alloy, and functions as an upper light shielding film (inner light shielding film) shielding the TFT 30. Further, the upper capacitance electrode 72 may be formed of elemental metal, alloy, metallic silicide, polysilicide, and lamination of theses, which includes any one of, for example, Ti, Cr, W, Ta, Mo, Pd, and the like having a high melting point. In this case, the function of the upper capacitance electrode 72 functioning as the inner light shielding film may be improved.

The lower capacitance electrode 71 is a pixel potential side capacitance electrode that is electrically connected to the pixel electrode side source drain area 1e of the TFT 30 and the pixel electrode 9a. More specifically, the lower capacitance electrode 71 is electrically connected to the pixel electrode side source drain area 1e through a contact hole 83, and is electrically connected to the first relay layer 91 through a contact hole 84. The first relay layer 91 is electrically connected to a second relay layer 92 through a contact hole 85. The second relay layer 92 is electrically connected to a third relay layer 93 through a contact hole 86. The third relay layer 93 is electrically connected to the pixel electrode 9a through a contact hole 87. That is, the lower capacitance electrode 71 relays the electrical connection between the pixel electrode side source drain area 1e and the pixel electrode 9a together with the first relay layer 91, the second relay layer 92, and the third relay layer 93. Further, the lower capacitance electrode 71 has not only a function of the pixel potential side capacitance electrode, but also a function of a light absorbing layer or a light shielding layer while being disposed between the TFT 30 and the upper capacitance electrode 72 as the upper light shielding film.

The dielectric film 75 has, for example, a single-layer structure or a multiple-layer structure including a silicon oxide ($SiO_2$) film such as a HTO (High Temperature Oxide) film and a LTO (Low Temperature Oxide) film or a silicon nitride (SiN) film.

The upper capacitance electrode 72, the lower capacitance electrode 71, and the dielectric film 75 are patterned by using, for example, the same mask so as to be formed at the same area. According to the storage capacitance 70 with this configuration, the potential holding characteristic in the pixel electrode 9a may be improved, and the display characteristic may be improved such that contrast is improved or flickering is reduced.

In FIGS. 5 and 6, a capacitance relay layer 200 is provided on the upper layer side of the storage capacitor 70 on the TFT array substrate 10 with a second interlayer isolation film 42 interposed therebetween. The capacitance relay layer 200 is electrically connected to the upper capacitance electrode 72 through a contact hole 250 formed in the second interlayer isolation film 42, and is configured to supply the potential supplied through the capacitance line 300 to the upper capacitance electrode 72. Specifically, as shown in FIG. 6, the capacitance line 300 is electrically connected to a fourth relay layer 94 through a contact hole 88. Further, the fourth relay layer 94 is electrically connected to the capacitance relay layer 200 through a contact hole 89. A fixed potential, for example, a counter common potential (that is, the potential supplied to the counter electrode 20 (refer to FIG. 2)) is supplied from the capacitance line 300.

In FIGS. 5 and 6, the data line 6a, the second relay layer 92, and the fourth relay layer 94 are provided on the upper layer side of the capacitance relay layer 200 on the TFT array substrate 10 with a third interlayer isolation film 43 interposed therebetween.

The data line 6a is electrically connected to the data line side source drain area 1d of the semiconductor layer la through a contact hole 81 penetrating the first interlayer isolation film 41, the second interlayer isolation film 42, and the third interlayer isolation film 43. The inner portions of the data line 6a and the contact hole 81 are formed of, for example, an Al (aluminum) containing material such as Al—Si—Cu and Al—Cu or only Al, or a multi-layer film including an Al layer, a TiN layer, and the like. The data line 6a has a function of shielding the TFT 30.

The second relay layer 92 and the fourth relay layer 94 are formed on the same layer as that of the data line 6a on the third interlayer isolation film 43. The data line 6a, the second relay layer 92, and the fourth relay layer 94 are formed in a manner such that, for example, a thin film formed of a conductive material such as a metallic film is formed on the third interlayer isolation film 43 by using a thin film forming method, and the thin film is partially removed, that is, patterned so that the line and the layers are separated from each other. In this manner, when the data line 6a, the second relay layer 92, and the fourth relay layer 94 are formed by the same process, the manufacturing process of the device may be simplified.

In FIGS. 5 and 6, the capacitance line 300 and the third relay layer 93 are provided on the upper layer side of the data line 6a on the TFT array substrate 10 with a fourth interlayer isolation film 44.

The capacitance line 300 is formed of, for example, metal containing aluminum, and supplies a fixed potential to the upper capacitance electrode 72 as described above. On the other hand, the third relay layer 93 formed on the same layer as that of the capacitance line 300 relays an electrical connection between the pixel electrode 9a and the pixel electrode side source drain area 1e in the semiconductor layer 1a.

In FIGS. 5 and 6, the pixel electrode 9a is formed on the upper layer side of the capacitance line 300 with a fifth interlayer isolation film 45 interposed therebetween. The pixel electrode 9a is electrically connected to the pixel electrode side source drain area 1e of the semiconductor layer 1a through the third relay layer 93, the second relay layer 92, the first relay layer, and the lower capacitance electrode 71. The contact hole 87 electrically connecting the pixel electrode 9a and the third relay layer 93 to each other is formed in a manner such that a film formed of a conductive material such as ITO forming the pixel electrode 9a is formed on the inner wall of the hole portion penetrating the fifth interlayer isolation layer 45. The upper surface of the pixel electrode 9a is provided with an alignment film that is subjected to a predetermined alignment treatment such as a rubbing treatment.

Each pixel unit has the same configuration as described above, and the pixel units are periodically formed on the image display area 10a (refer to FIG. 1).

Figure 7:
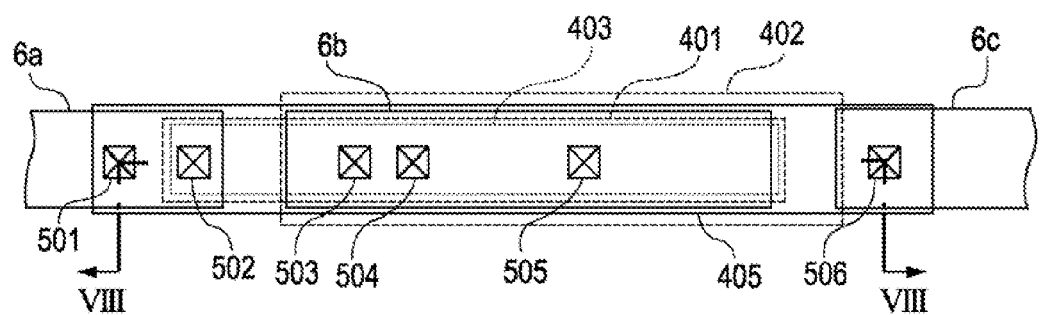
FIG. 7 is a plan view visibly illustrating respective layers forming an additional capacitor of the electro-optical device according to the first embodiment.
Figure 8:
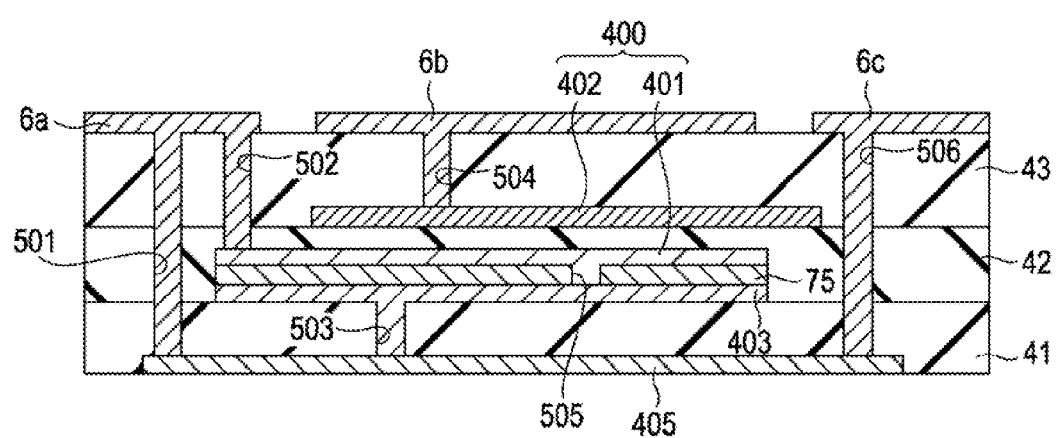
FIG. 8 is a cross-sectional view taken along the line VIII-VIII of FIG. 7.
Figure 9:
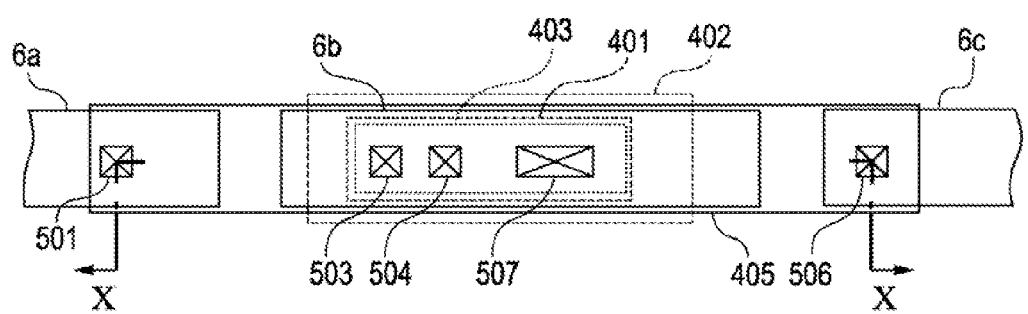
FIG. 9 is a plan view visibly illustrating respective layers forming an additional capacitor of an electro-optical device according to a comparative example.
Figure 10:
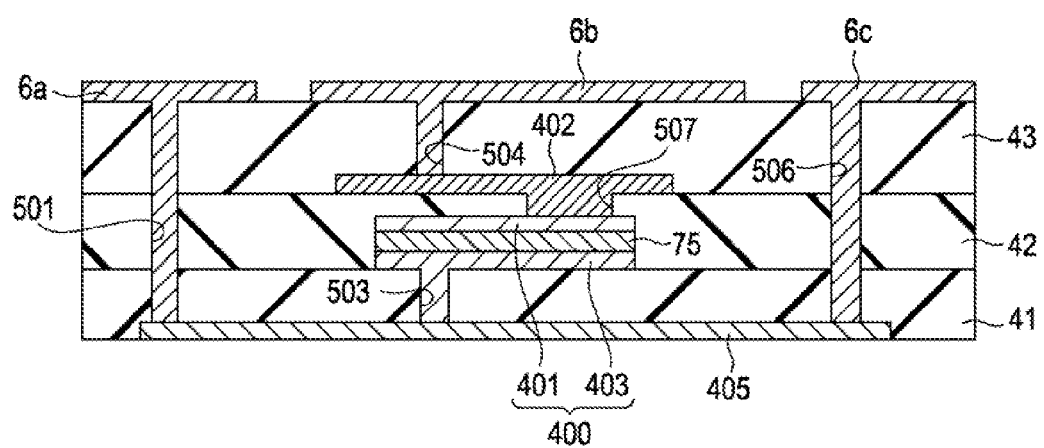
FIG. 10 is a cross-sectional view taken along the line X-X of FIG. 9.

Next, an additional capacitor provided in the peripheral area located in the periphery of the above-described pixel unit to be electrically connected to the data line will be described by referring to FIGS. 7 to 10. Here, FIG. 7 is a plan view visibly illustrating the respective layers forming the additional capacitor of the electro-optical device according to the first embodiment, and FIG. 8 is a cross-sectional view taken along the line VIII-VIII of FIG. 7. Further, FIG. 9 is a plan view visibly illustrating the respective layers forming an additional capacitor of an electro-optical device according to a comparative example, and FIG. 10 is a cross-sectional view taken along the line X-X of FIG. 9. Furthermore, in FIGS. 7 to 10, only the layers related to the additional capacitor among the respective layers shown in FIG. 5 or 6 is shown, and the other layers are not appropriately shown.

In FIGS. 7 and 8, in the periphery of the position where the additional capacitor is formed in the peripheral area, a capacitance relay layer 6b and an inspection circuit connection interconnection 6c are provided on the same layer as that of the data line 6a.

The data line 6a is electrically connected to a relay layer 405 at the end portion thereof through a contact hole 501. Further, the data line is electrically connected to a first additional capacitance electrode 401 through a contact hole 502.

The first additional capacitance electrode 401 is provided on the same layer as that of the upper capacitance electrode 72 in the pixel unit. The third additional capacitance electrode 403 is provided on the same layer as that of the lower capacitance electrode 71 in the pixel unit, and is disposed to face the first additional capacitance electrode 401 with a capacitance isolation film 75 interposed therebetween. However, the first additional capacitance electrode 401 and the third additional capacitance electrode 403 are electrically connected to each other through a contact hole 505. Further, the third additional capacitance electrode 403 is electrically connected to the relay layer 405 through a contact hole 503. For this reason, a capacitor is not formed between the first additional capacitance electrode 401 and the third additional capacitance electrode 403.

The capacitance relay layer 6b is a layer to which a constant potential is supplied from the capacitance line, and is electrically connected to the second additional capacitance electrode 402 through a contact hole 504. For this reason, the second additional capacitance electrode 402 has a constant potential. The second additional capacitance electrode 402 is provided on the same layer as that of the capacitance relay layer 200 (refer to FIG. 5 or 6) in the pixel unit.

The inspection circuit connection interconnection 6c is electrically connected to the relay layer 405 through a contact hole 506. In the inspection circuit connection interconnection 6c, the end portion opposite to the end portion shown in the drawing is electrically connected to the inspection circuit. Accordingly, an inspection potential may be supplied to the data line 6a.

In the embodiment, an additional capacitance 400 is formed between the first additional capacitance electrode 401 and the second additional capacitance electrode 402. According to the additional capacitor 400, for example, a variation in the potential (for example, a push-down or a push-up) necessary to be held by the data line 6a may be suppressed. Accordingly, the display irregularity caused by a variation in the potential of the data line 6a may be prevented, and the display quality may be improved.

Here, in the embodiment, particularly the first additional capacitance electrode 401 forming the additional capacitor 400 is provided on the same layer as that of the upper capacitance electrode 72 in the pixel unit, and the second additional capacitance electrode 402 is provided on the same layer as that of the capacitance relay layer 200. That is, one electrode forming the additional capacitor 400 is provided on the same layer as that of the electrode forming the storage capacitor 70, and the other electrode is provided on a layer different from that of the electrode forming the storage capacitor 70.

According to the above-described configuration, since the first additional capacitance electrode 401 and the second additional capacitance electrode 402 forming the additional capacitor 400 are respectively provided on the different layers, the pressure resistance performance of the additional capacitor may be improved. More specifically, as understood from the drawings, the end surfaces of the first additional capacitance electrode 401 and the second additional capacitance electrode 402 may be formed so as not to be evenly aligned with each other. Accordingly, the concentration of the electric field may be prevented, and the pressure resistance performance of the additional capacitor 400 may be improved.

In FIGS. 9 and 10, a case is assumed in which the additional capacitor 400 is formed between two same layers (that is, the first additional capacitance electrode 401 provided on the same layer as that of the upper capacitance electrode 72 and the lower capacitance electrode 71 provided on the same layer as that of the third additional capacitance electrode 403) forming the storage capacitor 70. In this case, the end surfaces of the first additional capacitance electrode 401 and the third additional capacitance electrode 403 are evenly aligned with each other as in the case of the upper capacitance electrode 72 and the lower capacitance electrode 71. Accordingly, the concentration of the electric field may be easily generated, and the pressure resistance performance of the additional capacitor 400 is remarkably reduced.

On the contrary, in the embodiment, as described above, the additional capacitor 400 is formed by the first additional capacitance electrode 401 and the second additional capacitance electrode 402 of which the end surfaces are not evenly aligned with each other. Accordingly, the high pressure resistance performance may be realized. A comparatively high voltage such as static electricity may be easily applied to the additional capacitor 400 compared to, for example, the storage capacitor 70 provided on the image display area 10a. Accordingly, the pressure resistance performance of the additional capacitor 400 may be improved, whereby the reliability of the device may be most effectively improved.

Further, since the first additional capacitance electrode 401 is provided on the same layer as that of the upper capacitance electrode 72 forming the storage capacitor 70, the configuration of the device and the manufacturing process thereof may be prevented from being complicated and an increase in the manufacturing cost may be prevented compared to the case where, for example, all the first additional capacitance electrode 401 and the second additional capacitance electrode 402 are formed on a layer different from that of the electrode forming the storage capacitor 70.

As described above, according to the electro-optical device of the embodiment, the pressure resistance performance of the additional capacitor 400 may be improved. Accordingly, the device having high reliability may be realized.

Second Embodiment

Next, an electro-optical device according to a second embodiment will be described by referring to FIGS. 11 to 15. Further, the second embodiment is different from the first embodiment in that a part of the laminated structure is different, but the other configuration and operation are substantially the same as those of the first embodiment. For this reason, in the second embodiment, only the part different from the first embodiment will be described in detail, and the repetitive description of the other same part will be appropriately omitted.

Figure 11:
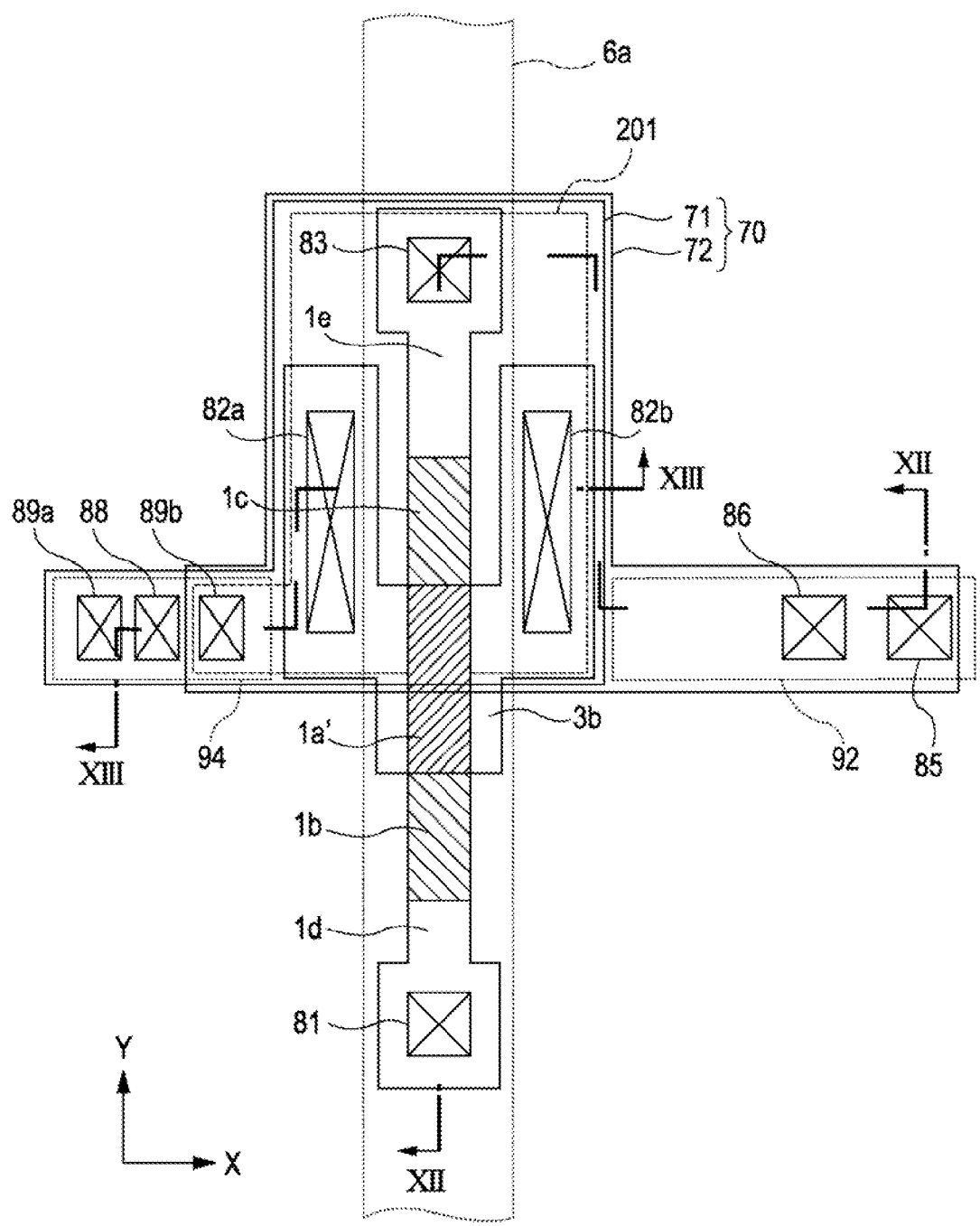
FIG. 11 is a plan view visibly illustrating a disposition of a conductive layer in the periphery of a TFT of an electro-optical device according to a second embodiment.
Figure 12:
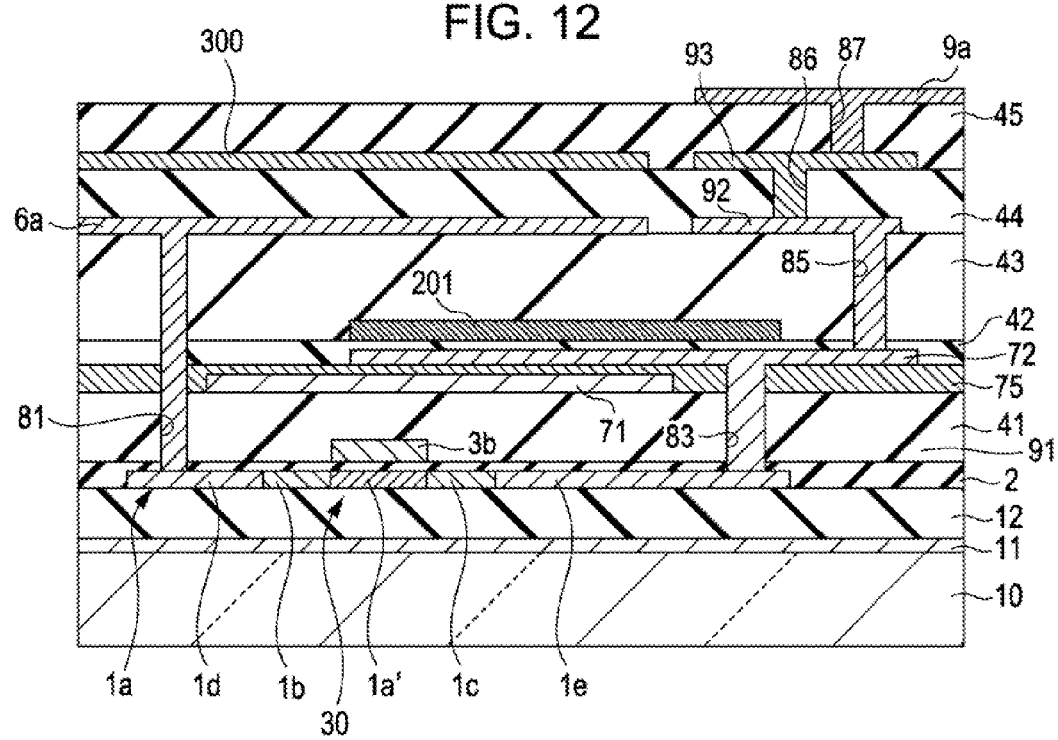
FIG. 12 is a cross-sectional view taken along the line XII-XII of FIG. 11.
Figure 13:
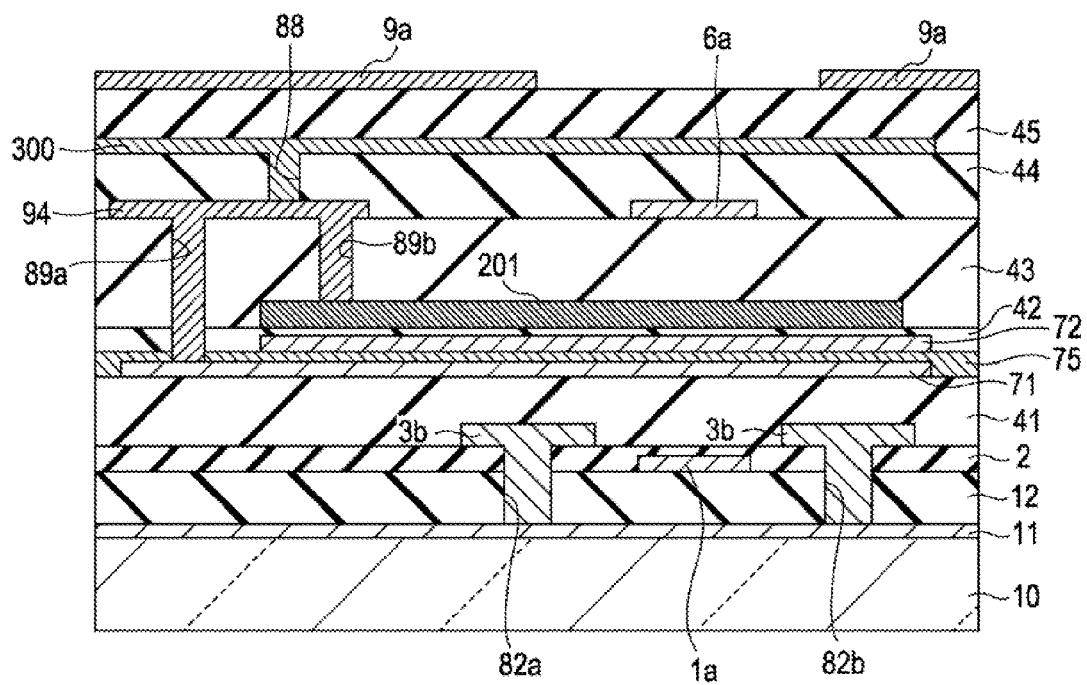
FIG. 13 is a cross-sectional view taken along the line XIII-XIII of FIG. 11.

First, the configuration of the pixel unit of the electro-optical device according to the second embodiment will be described by referring to FIGS. 11 to 13. Here, FIG. 11 is a plan view visibly illustrating the disposition of the conductive layer in the periphery of the TFT of the electro-optical device according to the second embodiment. FIG. 12 is a cross-sectional view taken along the line XII-XII of FIG. 11, and FIG. 13 is a cross-sectional view taken along the line XIII-XIII of FIG. 11. Further, in FIGS. 11 to 13, the scales of the respective layers and members are set to be different from the real scales so that the respective layers and members may be recognized on the drawings. In FIG. 11, for convenience of description, the respective layers on the lower layer side of the semiconductor layer and the upper layer side of the data line are not shown in the drawings.

In FIGS. 11 to 13, in the electro-optical device according to the second embodiment, the storage capacitor 70 is formed at two positions. Specifically, the storage capacitor 70 is formed at a position between the upper capacitance electrode 72 and the lower capacitance electrode 71 as the first embodiment, and a position between the upper capacitance electrode 72 and a parallel capacitance electrode 201. Accordingly, a structure is formed in which the two storage capacitors 70 are connected in parallel to each other.

In FIG. 12, the upper capacitance electrode 72 is electrically connected to the pixel electrode side source drain area 1e of the semiconductor layer 1a through the contact hole 83. Further, the upper capacitance electrode is electrically connected to the second relay layer 92 through the contact hole 85. Accordingly, the upper capacitance electrode 72 functions as the pixel potential side capacitance electrode.

In FIG. 13, the lower capacitance electrode 71 is electrically connected to the fourth relay layer 94 through the contact hole 89a. Further, the parallel capacitance electrode 201 is electrically connected to the fourth relay layer through the contact hole 89b. Accordingly, each of the lower capacitance electrode 71 and the parallel capacitance electrode 201 functions as a fixed potential side capacitance electrode.

According to the above-described configuration, the capacitance of the storage capacitor 70 may be increased as much as a capacitor formed between the upper capacitance electrode 72 and the parallel capacitance electrode 201 compared to the first embodiment. Further, the capacitor formed between the upper capacitance electrode 72 and the parallel capacitance electrode 201 is formed in an area overlapping with the capacitor formed between the upper capacitance electrode 72 and the lower capacitance electrode 71 in the plan view. Accordingly, the capacitance per the unit of the area may be increased.

Figure 14:
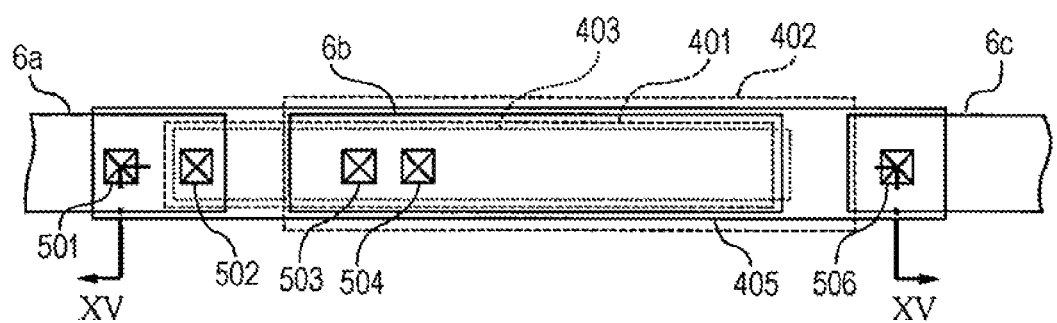
FIG. 14 is a plan view visibly illustrating respective layers forming an additional capacitor of the electro-optical device according to the second embodiment.
Figure 15:
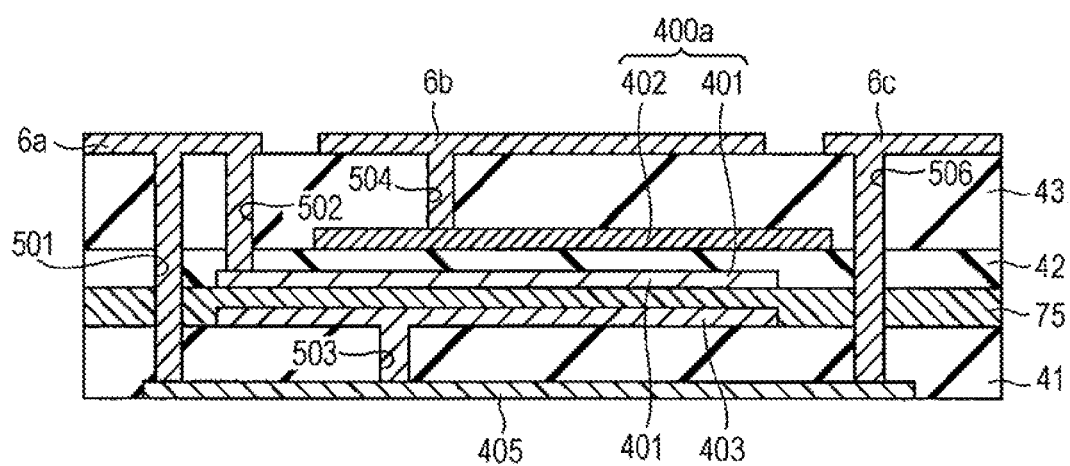
FIG. 15 is a cross-sectional view taken along the line XV-XV of FIG. 14.

Next, the configuration of the additional capacitor 400 according to the second embodiment will be described by referring to FIGS. 14 and 15. Here, FIG. 14 is a plan view visibly illustrating the respective layers forming the additional capacitor of the electro-optical device according to the second embodiment, and FIG. 15 is a cross-sectional view taken along the line XV-XV of FIG. 14. Further, in FIGS. 14 and 15, only the layers related to the additional capacitor among the respective layers shown in FIG. 5 or 6 is shown, and the other layers are not appropriately shown.

In FIGS. 14 and 15, in the electro-optical device according to the second embodiment, in addition to an additional capacitor 400a formed between the first additional capacitance electrode 401 and the second additional capacitance electrode 402. Accordingly, since the additional capacitor 400a is formed by the first additional capacitance electrode 401 and the second additional capacitance electrode 402 of which the end surfaces are not evenly aligned with each other, the high pressure resistance performance may be realized.

As described above, according to the electro-optical device of the second embodiment, the pressure resistance performance of the additional capacitor 400 may be appropriately improved, and the capacitance of the additional capacitor 400 may be increased. Accordingly, the more reliable device may be realized.

Third Embodiment

Next, an electro-optical device according to a third embodiment will be described by referring to FIGS. 16 to 18. Further, the third embodiment is different from the first and second embodiments in that a part of the laminated structure is different, but the other configuration and operation are the same as those of the first and second embodiments. For this reason, in the third embodiment, only the part different from the first and second embodiments will be described in detail, and the repetitive description of the other same part will be appropriately omitted.

First, the configuration of the pixel unit of the electro-optical device according to the third embodiment will be described by referring to FIGS. 16 to 18. Here, FIG. 16 is a plan view visibly illustrating the disposition of the conductive layer in the periphery of the TFT of the electro-optical device according to the third embodiment. FIG. 17 is a cross-sectional view taken along the line XVII-XVII of FIG. 16, and FIG. 18 is a cross-sectional view taken along the line XVIII-XVIII of FIG. 16. Further, in FIGS. 16 to 18, the scales of the respective layers and members are set to be different from the real scales so that the respective layers and members may be recognized on the drawings. In FIG. 16, for convenience of description, the respective layers on the lower layer side of the semiconductor layer and the upper layer side of the data line are not shown in the drawings.

Figure 16:
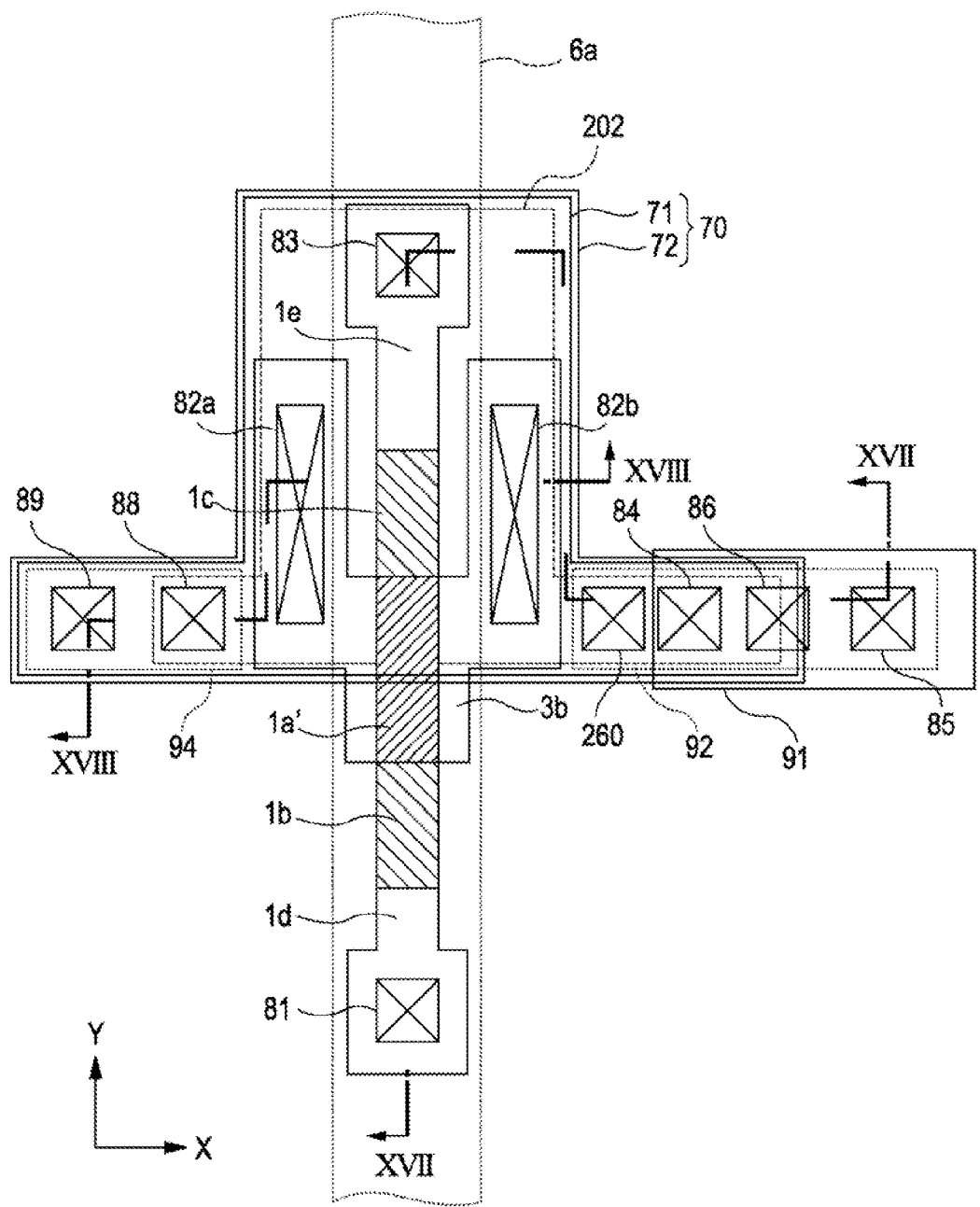
FIG. 16 is a plan view visibly illustrating a disposition of a conductive layer in the periphery of a TFT of an electro-optical device according to a third embodiment.
Figure 17:
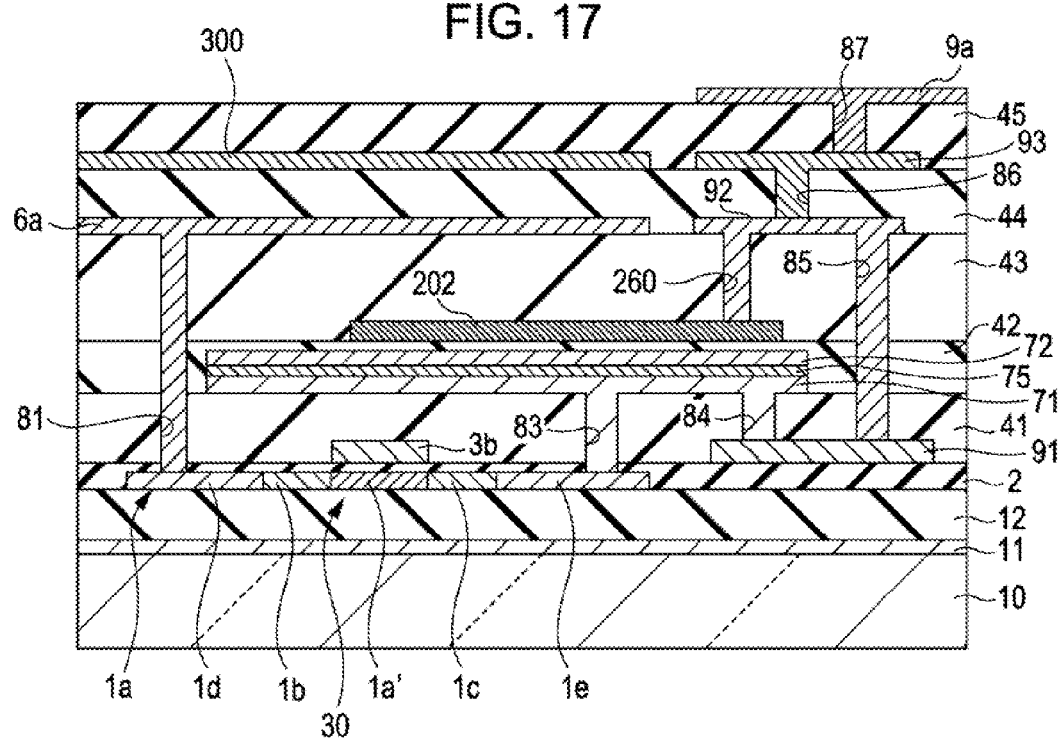
FIG. 17 is a cross-sectional view taken along the line XVII-XVII of FIG. 16.
Figure 18:
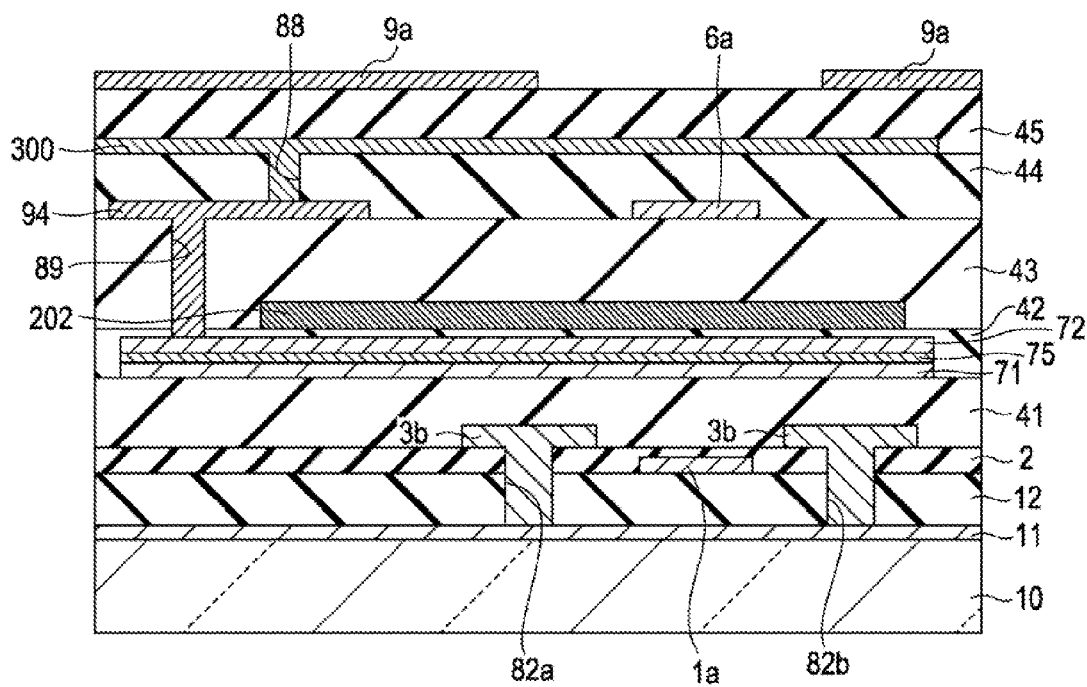
FIG. 18 is a cross-sectional view taken along the line XVIII-XVIII of FIG. 16.

In FIGS. 16 to 18, in the electro-optical device according to the third embodiment, the storage capacitor 70 is formed at two positions. Specifically, the storage capacitor 70 is formed at a position between the upper capacitance electrode 72 and the lower capacitance electrode 71 as the second embodiment, and a position between the upper capacitance electrode 72 and a parallel capacitance electrode 202. Accordingly, a structure is formed in which the two storage capacitors 70 are connected in parallel to each other.

In FIG. 17, the lower capacitance electrode 71 is electrically connected to the pixel electrode side source drain area 1e of the semiconductor layer 1a through the contact hole 83. Further, the parallel capacitance electrode 202 is electrically connected to the second relay layer 92 through the contact hole 260. Accordingly, each of the lower capacitance electrode 71 and the parallel capacitance electrode 202 functions as a pixel potential side capacitance electrode.

In FIG. 18, the upper capacitance electrode 72 is electrically connected to the fourth relay layer 94 through the contact hole 89. Accordingly, the upper capacitance electrode 72 functions as the pixel potential side capacitance electrode.

According to the above-described configuration, as in the second embodiment, the capacitance of the storage capacitor 70 may be increased as much as the capacitor formed between the upper capacitance electrode 72 and the parallel capacitance electrode 202. Further, the capacitor formed between the upper capacitance electrode 72 and the parallel capacitance electrode 202 is formed in an area overlapping with the capacitor formed between the upper capacitance electrode 72 and the lower capacitance electrode 71 in the plan view. Accordingly, the capacitance per the unit of the area may be increased.

The additional capacitor 400 of the electro-optical device of the third embodiment has the same configuration as that of FIGS. 7 and 8. That is, the additional capacitor has the same configuration as that of the electro-optical device according to the first embodiment. Accordingly, since the additional capacitor 400 is formed by the first additional capacitance electrode 401 and the second additional capacitance electrode 402 of which the end surfaces are not evenly aligned with each other, the high pressure resistance performance may be realized.

As described above, according to the electro-optical device of the third embodiment, the pressure resistance performance of the additional capacitor 400 may be improved by increasing the capacitance of the storage capacitor. Accordingly, the highly reliable device may be realized.

Fourth Embodiment

Next, an electro-optical device according to a fourth embodiment will be described by referring to FIGS. 19 and 20. Further, the fourth embodiment is different from the first to third embodiments in that a part of the operation method and the configuration of the additional capacitor are different, but the other configuration and operation are substantially the same as those of the first to third embodiments. For this reason, in the fourth embodiment, only the part different from the first to third embodiments will be described in detail, and the repetitive description of the other same part will be appropriately omitted.

First, the configuration of the pixel unit realizing the operation of the electro-optical device according to the fourth embodiment will be described by referring to FIG. 19. Here, FIG. 19 is a plan view illustrating the configuration of the electro-optical device according to the fourth embodiment.

Figure 19:
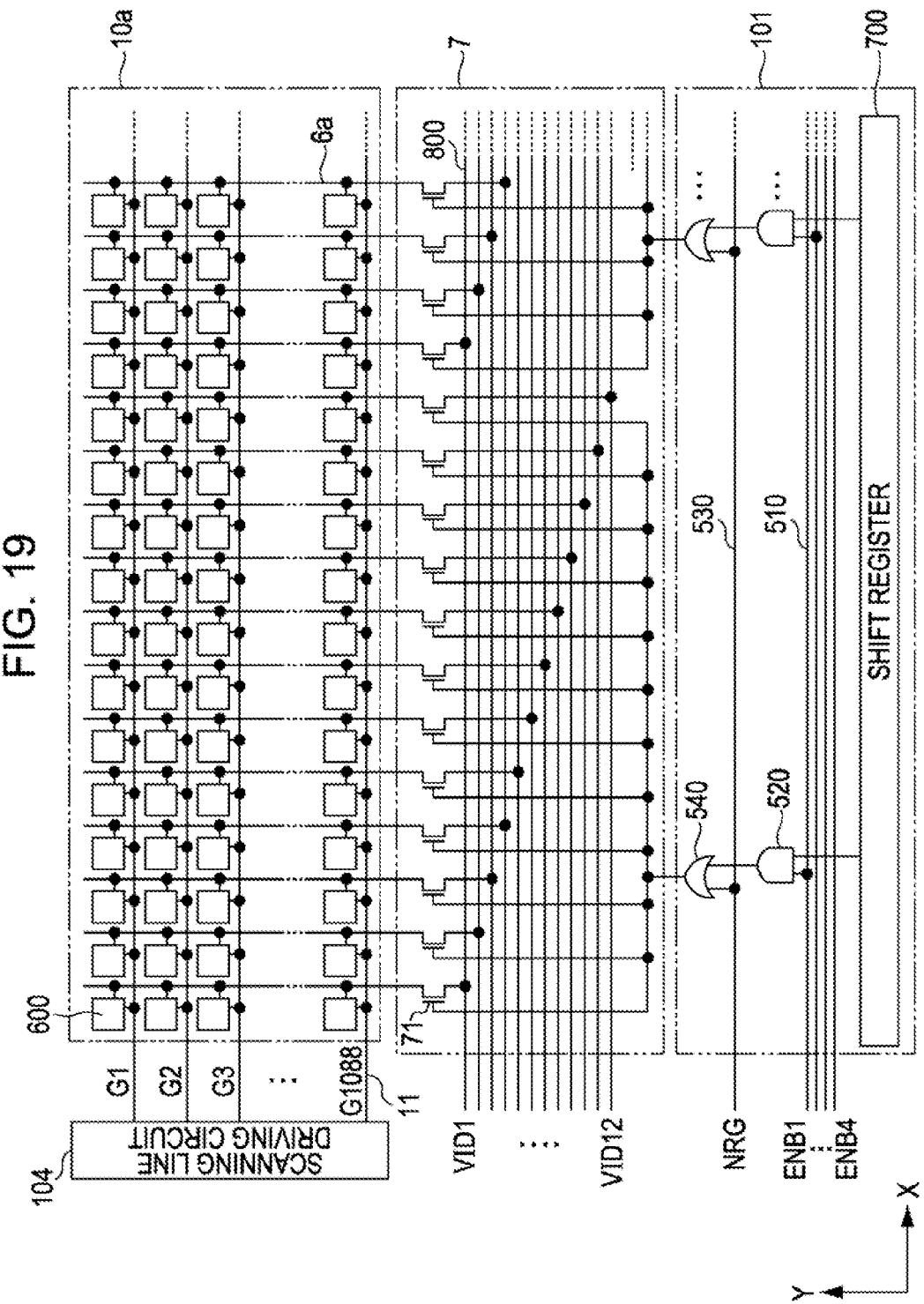
FIG. 19 is a plan view illustrating a configuration of an electro-optical device according to a fourth embodiment.

In FIG. 19, the electro-optical device according to the fourth embodiment has a structure in which the scanning line driving circuit 104, the data line driving circuit 101, and the sampling circuit 7 are disposed in the periphery of the image display area 10*a*.

The image display area 10*a* is an area where pixel units 600 each having the pixel electrode 9*a*, the TFT 30, the storage capacitor 70, and the like are arranged. Then, in the embodiment, 1088 rows of the scanning lines 11 are provided in the transverse direction (that is, the X direction), and 1984 columns of the data lines 6*a* are provided in the longitudinal direction (that is, the Y direction). Further, each pixel unit 600 is provided to correspond to each intersection between the scanning lines 11 and the data lines 6*a*.

The scanning line driving circuit 104 includes a shift register, and the scanning signals G1, G2, G3, . . . , and G1088 are respectively supplied to the scanning lines 11 at the 1-st, 2-nd, 3-rd, . . . , and 1088-th rows. Specifically, the scanning line driving circuit 104 sequentially selects the scanning lines 11 at the 1-st, 2-nd, 3-rd, . . . , and 1088-th rows for one frame period, where the scanning signal from the selected scanning line is set as the H level corresponding to the selection voltage, and the scanning signals from the other scanning lines are set as the L level corresponding to the non-selection voltage.

The data line driving circuit 101 includes a shift register 700, enable signal supply lines 510 respectively supplying enable signals ENB1 to ENB4, plural AND circuits 520, an NRG supply line 530 supplying a signal NRG, and plural OR circuits 540.

The signal output from the shift register 700 is first obtained by the logical multiplication of the enable signals ENB1 to ENB4 at the AND circuit 520, and then the logical multiplication signal is output to the OR circuit 540 at the rear stage. The logical sum between the logical multiplication signal and the signal NRG is obtained at the OR circuit 540, and then the logical sum signal is output to the sampling circuit 7.

The sampling circuit 7 includes plural image signal lines 800 supplying image signals output from an image signal output circuit (not shown) and transistors 71.

Twelve image signal lines 800 are provided to correspond to the image signals VID1 to VID12. That is, in the embodiment, the image signal is converted from serial to parallel at the twelve channels. Such a serial-parallel conversion may be performed by the circuit provided on the TFT array substrate 10 or may be performed by the circuit provided on an external member (for example, a flexible substrate connected to the electro-optical device).

Each of the transistors 71 is, for example, an re-channel type TFT (Thin Film Transistor), and is provided for each of the data lines 6*a* at the 1-st to 1984-th columns. Each transistor 71 is controlled by the signal supplied from the data line driving circuit 101, and functions as a sampling switch.

Here, in the embodiment, particularly the image signal is sampled at the sampling circuit 7, and is supplied to each data line block including twelve data lines 6*a* in time series. That is, the image signal is simultaneously supplied to the twelve data lines 6*a*.

Next, the configuration and the effect of the additional capacitor of the electro-optical device according to the fourth embodiment will be described by referring to FIG. 20. Here, FIG. 20 is a conceptual diagram illustrating the configuration of the additional capacitor of the electro-optical device according to the fourth embodiment.

Figure 20:
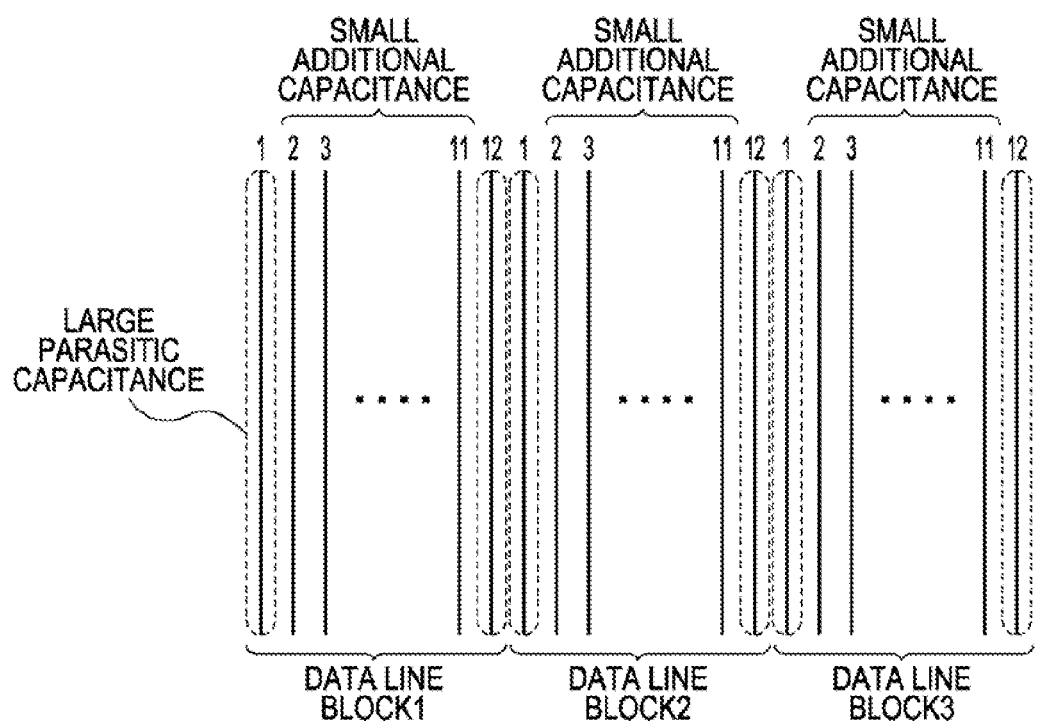
FIG. 20 is a conceptual diagram illustrating a configuration of an additional capacitor of the electro-optical device according to the fourth embodiment.

In FIG. 20, in the case of three data line blocks adjacent to each other, when signals are written to the data lines 6*a* (that is, the first and twelfth data lines) located at both ends of the data line block, signals are held or completely written to the adjacent data lines (that is, the data lines of the other data line blocks). For this reason, parasitic capacitance becomes comparatively large.

On the other hand, when signals are written to the data lines (that is, the second to eleventh data lines) not located at the ends of the data line block, the signals are written to the adjacent data lines in this state. For this reason, parasitic capacitance becomes comparatively small. Accordingly, if any countermeasure is not prepared, a difference in the parasitic capacitance occurs in each data line of the data line block.

However, in this structure, as shown in the drawing, the additional capacitor 400 electrically connected to the data line located at the end of the data line block is set to be smaller than the additional capacitor 400 electrically connected to the other data line of the data line block. That is, when the capacitance of the additional capacitor of the data line 6*a* causing comparatively large parasitic capacitance is set to be small, a difference in the capacitance obtained by adding the parasitic capacitance to the additional capacitor 400 may be reduced. Accordingly, a problem such as a sequential stripe in the display caused by a difference in the capacitance may be effectively prevented.

As described above, according to the electro-optical device of the fourth embodiment, a high-quality image display may be realized by adjusting the capacitance of the additional capacitor 400.

Electronic Apparatus

Figure 21:
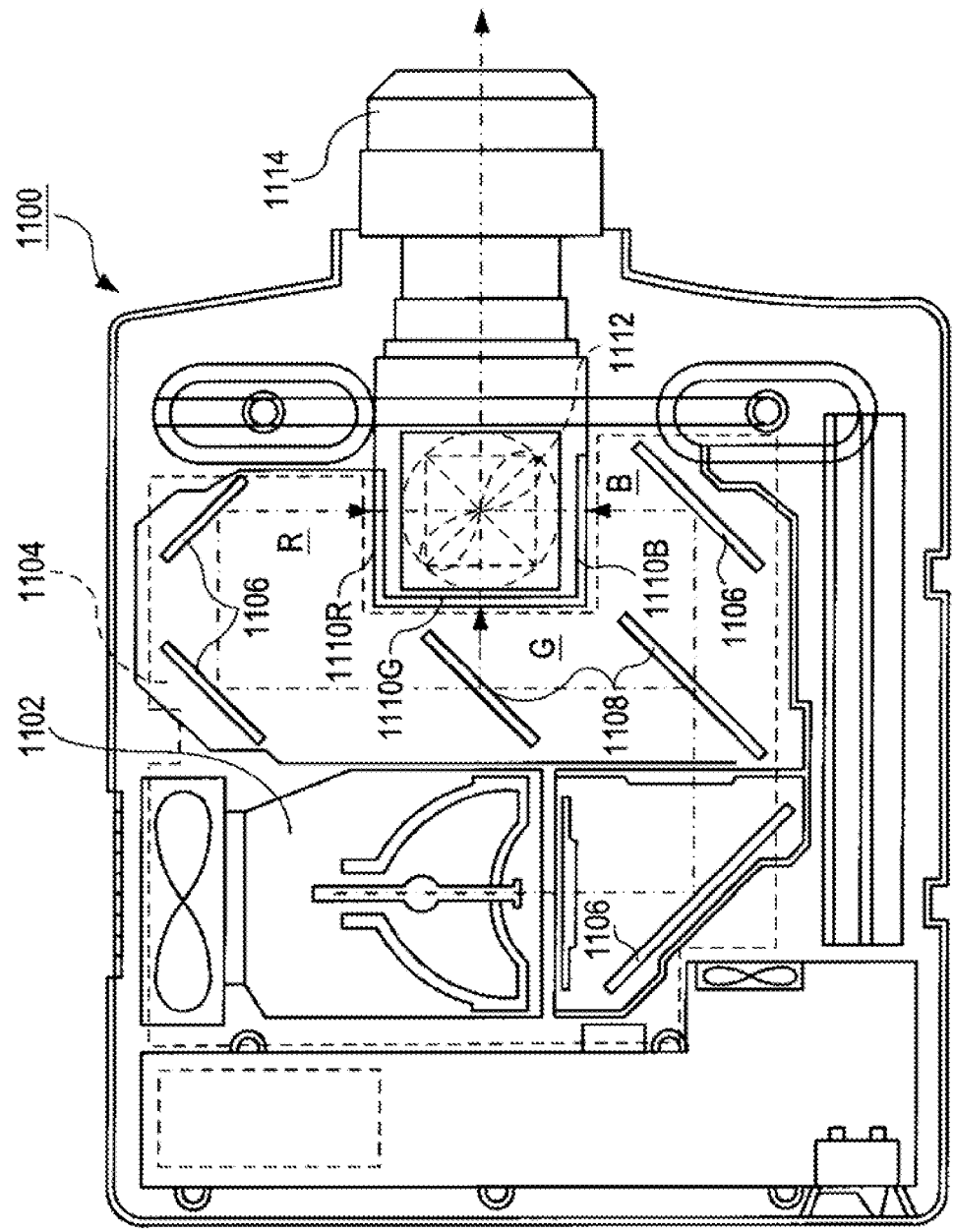
FIG. 21 is a plan view illustrating a configuration of a projector as an example of an electronic apparatus adopting the electro-optical device.

Next, a case will be described in which the liquid crystal device as the electro-optical device is applied to various electronic apparatuses. Here, FIG. 21 is a plan view illustrating a configuration example of a projector. Hereinafter, a projector using the liquid crystal device as a light bulb will be described.

As shown in FIG. 21, a projector 1100 includes a lamp unit 1102 which is formed of a white light source such as a halogen lamp. The projection light emitted from the lamp unit 1102 is divided into three primary colors of RGB by four mirrors 1106 and two dichroic mirrors 1108 disposed inside a light guide 1104, and is incident to the liquid crystal panels 1110R, 1110B, and 1110G as the light bulbs corresponding to the primary colors.

The configuration of the liquid crystal panels 1110R, 1110B, and 1110G is the same as that of the above-described liquid crystal device, and the liquid crystal panels are driven by the primary colors of R, G, and B supplied from an image signal processing circuit. Then, the light modulated by the liquid crystal panel is incident into a dichroic prism 1112 in three directions. In the dichroic prism 1112, the light of R and B is refracted by 90°, while the light of G travels straight. Accordingly, the respective colors of the image are synthesized, so that a color image is projected on a screen or the like through a projection lens 1114.

Here, regarding the display image formed by the liquid crystal panels 1110R, 1110B, and 1110G, the display image formed by the liquid crystal panel 1110G needs to be reversed in the transverse direction with respect to the display images formed by the liquid crystal panels 111OR and 1110B.

Further, since the light corresponding to the primary colors of R, G, and B is incident to the liquid crystal panels 1110R, 1110B, and 1110G by the dichroic mirror 1108, a color filter does not need to be provided.

Further, in addition to the electronic apparatus described by referring to FIG. 21, a mobile personal computer, a cellular phone, a liquid crystal television, a view finder type or a monitor direct view type video tape recorder, a car navigation device, a pager, an electronic scheduler, a calculator, a word processor, a workstation, a television phone, a POS terminal, and an apparatus equipped with a touch panel may be exemplified. As such, the disclosure may be applied to these various electronic apparatuses.

Furthermore, the disclosure may be applied to not only the liquid crystal device described in the embodiments, but also a reflection type liquid crystal device (LCOS), a plasma display (PDP), an electric-field emission type display (FED, SED), an organic EL display, a digital micro-mirror device (DMD), an electrophoretic device, and the like.

The disclosure is not limited to the above-described embodiments, and may be appropriately modified within the scope not departing from the concept or the spirit of the disclosure obtained from the claims and specification. It should be understood that the electro-optical device having these modifications and the electronic apparatus including the electro-optical device are included in the technical scope of the disclosure.

What is claimed is:

1. An electro-optical device comprising:
   a substrate including:
      a pixel unit provided in a display area and comprising:
         a pixel electrode,
         a transistor corresponding to the pixel electrode,
         a data line electrically connected to the transistor, and
         a storage capacitor provided between the pixel electrode and the transistor, the storage capacitor having a first capacitance electrode and a second capacitance electrode disposed so as to face each other with a capacitance isolation film interposed therebetween; and
      an additional capacitor provided in a peripheral area located between the display area and one side edge of the substrate, when viewed in plan view;
   wherein
      the additional capacitor is electrically connected to the data line and comprises a first additional capacitance electrode and a second additional capacitance electrode disposed so as to face each other with an additional capacitance isolation film interposed therebetween,
      the first additional capacitance electrode is provided, in the peripheral area, on a same layer as the first capacitance electrode provided in the display area,
      the second additional capacitance electrode is provided, in the peripheral area, on a layer different from the layers of the first capacitance electrode and second capacitance electrode in the display area, and
      the first additional capacitance electrode is disposed so as to overlap with the second additional capacitance electrode in plan view.

2. The electro-optical device according to claim 1, wherein the first capacitance electrode and second capacitance electrode are patterned to be formed with a same area in plan view.

3. The electro-optical device according to claim 1, wherein the additional capacitor further comprises:
   a third additional capacitance electrode which is formed on a same layer as the second capacitance electrode,
   wherein the first additional capacitance electrode and the third additional capacitance electrode are disposed to face each other with another capacitance isolation film interposed therebetween.

4. The electro-optical device according to claim 3,
   wherein the first capacitance electrode is electrically connected to the pixel electrode and the transistor, and
   wherein the second additional capacitance electrode is electrically connected to a constant potential interconnection supplying a constant potential.

5. The electro-optical device according to claim 3,
   wherein the first capacitance electrode is electrically connected to a constant potential interconnection supplying a constant potential, and
   wherein the second capacitance electrode is electrically connected to the pixel electrode and the transistor.

6. The electro-optical device according to claim 1, wherein the first additional capacitance electrode is electrically connected to an electrode provided on a same layer as that of the second capacitance electrode.

7. The electro-optical device according to claim 1, further comprising:
   data line blocks each including a plurality of data lines; and
   an image signal supply unit which supplies an image signal to each of the data line blocks,
   wherein a capacitance of the additional capacitor electrically connected to the data lines located at an end of each of the data line blocks is smaller than a capacitance of the additional capacitor electrically connected to other data lines of each of the data line blocks.

8. An electronic apparatus comprising the electro-optical device according to claim 1.

9. The electro-optical device according to claim 1, wherein an end surface of the first additional capacitance electrode and a corresponding end surface of the second additional capacitance electrode are not evenly aligned.

10. The electro-optical device according to claim 1, wherein the second capacitance electrode is disposed between the first capacitance electrode and the transistor.

11. The electro-optical device according to claim 1, wherein
   the substrate further includes an inspection circuit, and
   the additional capacitor is further electrically connected to the inspection circuit.

* * * * *